US012569830B2

(12) United States Patent
Kuk et al.

(10) Patent No.: US 12,569,830 B2
(45) Date of Patent: Mar. 10, 2026

(54) CERAMIC CATALYTIC FILTER, FILTERING SYSTEM INCLUDING THE SAME, AND MANUFACTURING METHOD THEREOF

(71) Applicant: SAMSUNG ELECTRONICS CO., LTD., Suwon-si (KR)

(72) Inventors: Sukeun Kuk, Suwon-si (KR); Minseok Koo, Suwon-si (KR); Hyukjae Kwon, Suwon-si (KR); Dongsik Yang, Seoul (KR); Sehyeong Oh, Seoul (KR); Hyun Chul Lee, Hwaseong-si (KR); Sangmin Ji, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1228 days.

(21) Appl. No.: 17/460,609

(22) Filed: Aug. 30, 2021

(65) Prior Publication Data

US 2022/0297089 A1     Sep. 22, 2022

(30) Foreign Application Priority Data

Mar. 19, 2021     (KR) ......................... 10-2021-0036240

(51) Int. Cl.
B01J 21/06          (2006.01)
B01D 53/94          (2006.01)
(Continued)

(52) U.S. Cl.
CPC ............ B01J 21/063 (2013.01); B01D 53/94 (2013.01); B01J 27/08 (2013.01); B01J 31/068 (2013.01); B01J 35/19 (2024.01); B01J 35/39 (2024.01); B01J 35/40 (2024.01);

B01J 35/45 (2024.01); B01J 35/612 (2024.01); B01J 35/613 (2024.01); B01J 35/615 (2024.01); B01J 35/633 (2024.01); (Continued)

(58) Field of Classification Search
None
See application file for complete search history.

(56) References Cited

U.S. PATENT DOCUMENTS

2007/0202334 A1 * 8/2007 Xie ........................ B01J 37/036
977/777
2010/0010513 A1 1/2010 Yun et al.
(Continued)

FOREIGN PATENT DOCUMENTS

CN        205216421 U   *  5/2016
JP        1996112516 A      5/1996
(Continued)

OTHER PUBLICATIONS

Teng et al. CN205216421U-translated document (Year: 2016).*
Kim et al. KR102017671B1-translated document (Year: 2019).*

*Primary Examiner* — Jelitza M Perez
(74) *Attorney, Agent, or Firm* — CANTOR COLBURN LLP

(57)          ABSTRACT

A ceramic catalyst filter, a filtering system including the same, and a method of manufacturing the same. The ceramic catalyst filter includes: a single body ceramic filter including a first surface for blocking a first material and a second surface for removing the second material passing through the first surface; and a photocatalyst thin film including nanometer-scale grains coated on a surface of the ceramic filter.

25 Claims, 24 Drawing Sheets

CERAMIC FILTER

PHOTOCATALYST SYNTHESIS AND COATING BY ONE-POT METHOD

CERAMIC CATALYST FILTER $CO_2 + H_2O$

VOC

NANOSTRUCTURE PHOTOCATALYST THIN FILM

(51) Int. Cl.

| | |
|---|---|
| *B01J 27/08* | (2006.01) |
| *B01J 31/06* | (2006.01) |
| *B01J 35/00* | (2006.01) |
| *B01J 35/39* | (2024.01) |
| *B01J 35/40* | (2024.01) |
| *B01J 35/45* | (2024.01) |
| *B01J 35/61* | (2024.01) |
| *B01J 35/63* | (2024.01) |
| *B01J 35/64* | (2024.01) |
| *B01J 37/02* | (2006.01) |
| *B01J 37/08* | (2006.01) |

(52) U.S. Cl.
CPC ........... *B01J 35/635* (2024.01); *B01J 35/643* (2024.01); *B01J 35/647* (2024.01); *B01J 35/651* (2024.01); *B01J 37/0219* (2013.01); *B01J 37/0236* (2013.01); *B01J 37/088* (2013.01); *B01D 2255/20707* (2013.01); *B01D 2255/802* (2013.01); *B01D 2255/9155* (2013.01); *B01D 2255/9207* (2013.01); *B01J 2235/15* (2024.01); *B01J 2235/30* (2024.01)

(56) References Cited

U.S. PATENT DOCUMENTS

| | | | | |
|---|---|---|---|---|
| 2010/0135864 A1* | 6/2010 | Taniguchi | .............. | B01J 27/135 |
| | | | | 502/77 |
| 2015/0306271 A1* | 10/2015 | Willette | ................ | B01D 53/96 |
| | | | | 422/119 |
| 2016/0129432 A1* | 5/2016 | Ozaki | ...................... | B01J 23/72 |
| | | | | 502/309 |
| 2021/0094026 A1 | 4/2021 | Kwon et al. | | |

FOREIGN PATENT DOCUMENTS

| | | | | | |
|---|---|---|---|---|---|
| JP | 3540964 | B2 | 7/2004 | | |
| KR | 100817440 | B1 | 3/2008 | | |
| KR | 100932949 | B1 | 12/2009 | | |
| KR | 102017671 | B1 * | 9/2019 | ........... | B01J 37/345 |
| KR | 1020210039201 | A | 4/2021 | | |

* cited by examiner

CERAMIC FILTER

PHOTOCATALYST SYNTHESIS
AND COATING BY
ONE-POT METHOD

CERAMIC
CATALYST FILTER

NANOSTRUCTURE
PHOTOCATALYST THIN FILM

CERAMIC CATALYTIC FILTER, FILTERING SYSTEM INCLUDING THE SAME, AND MANUFACTURING METHOD THEREOF

CROSS-REFERENCE TO RELATED APPLICATION

This application is claims priority to and the benefit of Korean Patent Application No. 10-2021-0036240, filed on Mar. 19, 2021, in the Korean Intellectual Property Office, and all the benefits accruing therefrom under 35 U.S.C. § 119, the content of which in its entirety is herein incorporated by reference.

BACKGROUND

1. Field

The present disclosure relates to a ceramic catalyst filter, a filtering system using the same, and a method of manufacturing the same.

2. Description of the Related Art

A filter for reducing fine dust may be made of a material such as glass fiber or plastic and classified for use according to performance into grades such as medium, high-efficiency particulate air (HEPA), ultra-low particle air (ULPA), etc. HEPA filters have excellent performance capable of adsorbing fine dust particles of 0.3 micrometers ($\mu m$) in size up to 99.97%, but the efficiency thereof decreases when humidity is high, and exchange may occur after filtering for a certain period. To improve these drawbacks, a ceramic carrier filter, referred to as a diesel particulate filter (DPF) for vehicles, may be used to reduce fine dust. This DPF filter is utilized as a soot filter and is recyclable based on pyrolysis at a high temperature.

A volatile organic compound (VOC) is a precursor material of fine dust, and VOC reduction is also desired for fine dust reduction. In the case of VOC reduction, adsorption-based elimination using activated carbon, etc., is used. However, this also requires exchange after filtering for a certain period. Therefore, VOC decomposition technology using a thermal catalyst and a photocatalyst and a photocatalyst for sustainable VOC removal is being studied. These VOC removal catalysts are coated on a ceramic filter by a dip coating method using a sol-gel method or by a method using a binder for adhesion after catalyst synthesis, and are used to remove nitrogen oxides (NOx) and the like.

As described above, in the case of fine dust removal and VOC removal technology, there is a limitation that exchange may occur due to the non-recyclable filter or absorbent material. In addition, there is a problem that different filters may be used to simultaneously remove fine dust and VOC, which causes fine dust.

SUMMARY

An embodiment provides a ceramic catalyst filter that is recyclable and also may simultaneously remove fine dust and a volatile organic compound (VOC), which causes fine dust.

In an embodiment, a ceramic catalyst filter including a single body ceramic filter comprising a first surface for blocking a first material and a second surface for removing a second material passing through the first surface; and a photocatalyst thin film comprising nanometer-scale grains coated on a surface of the ceramic filter.

An embodiment provides a filtering system including the ceramic catalyst filter.

An embodiment provides a method of manufacturing the ceramic catalyst filter.

Additional aspects will be set forth in part in the description which follows and, in part, will be apparent from the description, or may be learned by practice of the presented embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
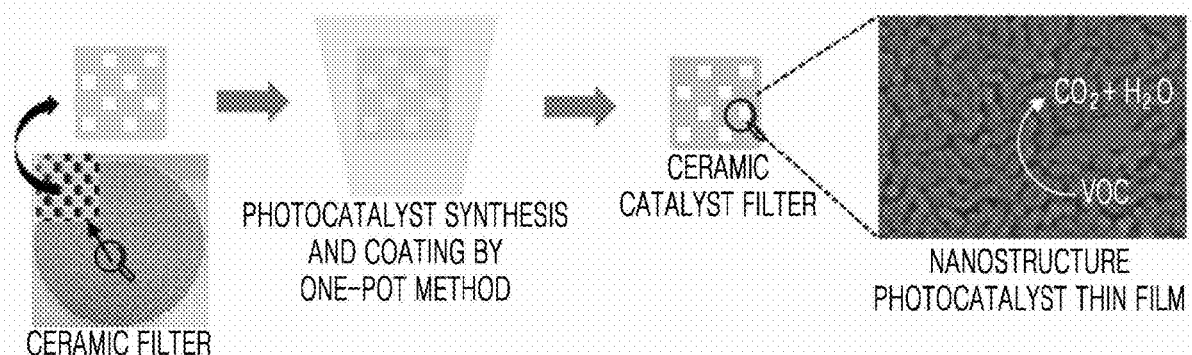
FIG. 1 is a schematic view for explaining a method of manufacturing a ceramic catalyst filter according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The present inventive concept will now be described more fully with reference to the accompanying drawings, in which example embodiments are shown. The present disclosure may, however, be embodied in many different forms, should not be construed as being limited to the embodiments set forth herein, and should be construed as including all modifications, equivalents, and alternatives within the scope of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, parts, components, materials, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present disclosure is not limited thereto. Throughout the written description and drawings, like reference numbers and labels will be used to denote like or similar elements. It will also be understood that when an element such as a layer, a film, a region, a component, or a plate is referred to as being "on" another layer or element, it can be "directly on" the other layer or element, or intervening layers, regions, or components may also be present. Although the terms "first", "second", "third", etc. may be used herein to describe various elements, components, regions, and/or layers, these elements, components, regions, and/or layers should not be limited by these terms. These terms are used only to distinguish one component from another, not for purposes of limitation.

The terminology used herein is for the purpose of describing particular embodiments only and is not intended to be limiting. The term "or" means "and/or". The term "and/or" used herein refers to at least one of a list of one or more related items. It will be further understood that the terms "comprises" and/or "comprising," when used herein, specify the presence of stated features, regions, integers, steps, operations, and/or elements.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be round. Thus, the regions illustrated in the figures are schematic in nature and their shapes are not intended to illustrate the precise shape of a region and are not intended to limit the scope of the present claims.

Hereinafter, an embodiment of a ceramic catalyst filter, a method of preparing the same, and a filtering system including the ceramic catalyst filter will be described in greater detail.

A ceramic catalyst filter according to an embodiment includes: a ceramic filter being a single body structure having a first surface blocking a first material and a second surface removing a second material passing through the first surface; and a photocatalyst thin film having a nanostructure including nanometer-scale grains coated on a surface of the ceramic filter, wherein the grains form a worm-like alignment structure. As used herein, "thin film" is a layer of material ranging from fractions of a nanometer (monolayer) to several micrometers in thickness. As used herein, a "worm-like alignment structure" refers to a curved line, which may include multiple curves.

The ceramic filter being a single body structure having a first surface blocking a first material and a second surface removing a second material passing through the first surface has a porous three-dimensional structure. The ceramic filter having a porous three-dimensional structure has a form in which inlets of cells are alternately blocked, and may remove fine dust in a wall-flow filtering manner, and at the same time, remove a volatile organic compound (VOC) in the air by generation of reactive oxygen species (ROS) under light irradiation. The ceramic catalyst filter coated with the photocatalyst thin film is recyclable by washing with water or pyrolysis at a high temperature. The structure of the ceramic filter will be described in detail herein.

The ceramic catalyst filter according to an embodiment has a nanostructure photocatalyst thin film including nanometer-scale grains, coated on the inner wall surface as well as on the outer wall of the ceramic filter having a porous three-dimensional structure. Here, the grains of the photocatalyst thin film have a unique form that forms a worm-like alignment structure.

FIG. 1 is a schematic view for explaining a method of manufacturing a ceramic catalyst filter according to an embodiment and shows a coated form of a photocatalyst thin film of the ceramic catalyst filter obtained according to the embodiment. As shown in FIG. 1, because the ceramic filter has a three-dimensional structure having a complex inner structure, by coating, on the inner and outer surfaces of the ceramic filter by using a simple one-pot type method with a self-assembly polymer, a photocatalyst thin film having a uniform nanostructure over a large area, the recyclable ceramic catalyst filter for removing fine dust and VOC at the same time may be manufactured.

The grains coated on the surface of the ceramic filter may have an average grain size of about 1 nanometer (nm) to about 1,000 nm in a nanometer scale. For example, an average grain size of the grains may be about 1 nm to about 100 nm, for example, about 5 nm to about 50 nm, for example, about 5 nm to about 30 nm. Within these ranges, a photocatalyst thin film having a specific surface area of a desired level may be obtained.

In an embodiment, the photocatalyst thin film have a specific surface area of about 1 to about 300 square meters per gram ($m^2\ g^{-1}$), pores having a diameter of about 1 nm to about 100 nm, and a pore volume in a range of about $1\times10^{-3}$ to about 1 cubic centimeters per gram ($cm^3\ g^{-1}$). Within these ranges, a ceramic catalyst filter with excellent photolysis and pyrolysis effects may be obtained. Specific surface area and pore size may be determined by Brunauer-Emmett-Teller (BET) and Barrett-Joyner-Halenda (BJH) analyses, respectively, A specific surface area of the photocatalyst thin film may be in a range of about 20 to about 300 square meters per gram ($m^2/g$). For example, the specific surface area of the photocatalyst thin film may be in a range of about 30 to about 250 $m^2/g$. For example, the specific surface area of the photocatalyst thin film may be in a range of about 50 to about 230 $m^2/g$. Within these ranges, due to a large surface area, desired levels of adsorption efficiency and decomposition efficiency of VOC may be obtained. The larger the specific surface area of the photocatalyst thin film, the adsorption efficiency and decomposition efficiency of VOC increase.

The photocatalyst thin film may include a metal oxide photocatalyst. In an embodiment, the metal oxide photocatalyst may include $TiO_2$, $WO_3$, $Fe_2O_3$, $BiVO_4$, $ZnO$, $SiO_2$, $BaTiO_3$, $Fe_2O_3$, $Fe_3O_4$, or a combination thereof.

In an embodiment, the photocatalyst thin film may further include a cocatalyst for improving the photolysis characteristics or pyrolysis characteristics of the metal oxide photocatalyst. For example, the cocatalyst may include:

i) a metal compound capable of performing an oxygen generation reaction or an oxygen reduction reaction;

ii) a metal compound capable of performing an oxidation reaction at about 200° C. or less; or iii) a combination thereof.

The cocatalyst may include, for example, $CoO_x$ (wherein $0 < x < 2$), $MnO_2$, $ZnO_2$, $BiOBr$, $BiOI$, a noble metal oxide (for example, Au oxide, Ag oxide, Ir oxide, Rh oxide, Pt oxide, Ce oxide, or the like), Cu, Co, Ni, Mn, Fe, Al, Si, a noble metal, or a combination thereof.

In relation to particle forms, the metal oxide photocatalyst and the cocatalyst may each independently have a particle form of a spherical form, a tubular form, a rod form, a fibrous form, a sheet form, or a combination thereof, and may have the same or different forms in order to control the absorbance efficiency of the ceramic catalyst filter.

An embodiment of a recyclable ceramic catalyst filter, a filtering system including the same, a management method thereof, and a method of manufacturing the ceramic catalyst filter will be described with reference to the appended drawings. In the drawings, the thickness of layers or regions may be exaggerated for clarity.

The ceramic catalyst filter according to an embodiment uses a ceramic filter that is a single body structure having a first surface blocking a first material and a second surface removing a second material passing through the first surface, the single body structure having a three-dimensional structure.

The single body structure of the ceramic filter may be porous. The single body structure may entirely be of the same ceramic material. In an embodiment, the single body structure may entirely be of the same catalyst material. In this case, the second surface may be of a photocatalyst material that is activated by light energy.

The first and second surfaces may each include surfaces that are vertically or horizontally parallel to each other.

The first material may include fine dust, and the second material may include a VOC.

On the surface of the ceramic filter, coated is a photocatalyst thin film having a nanostructure including nanometer-scale grains, wherein the grains form a worm-like alignment structure.

Figure 17:
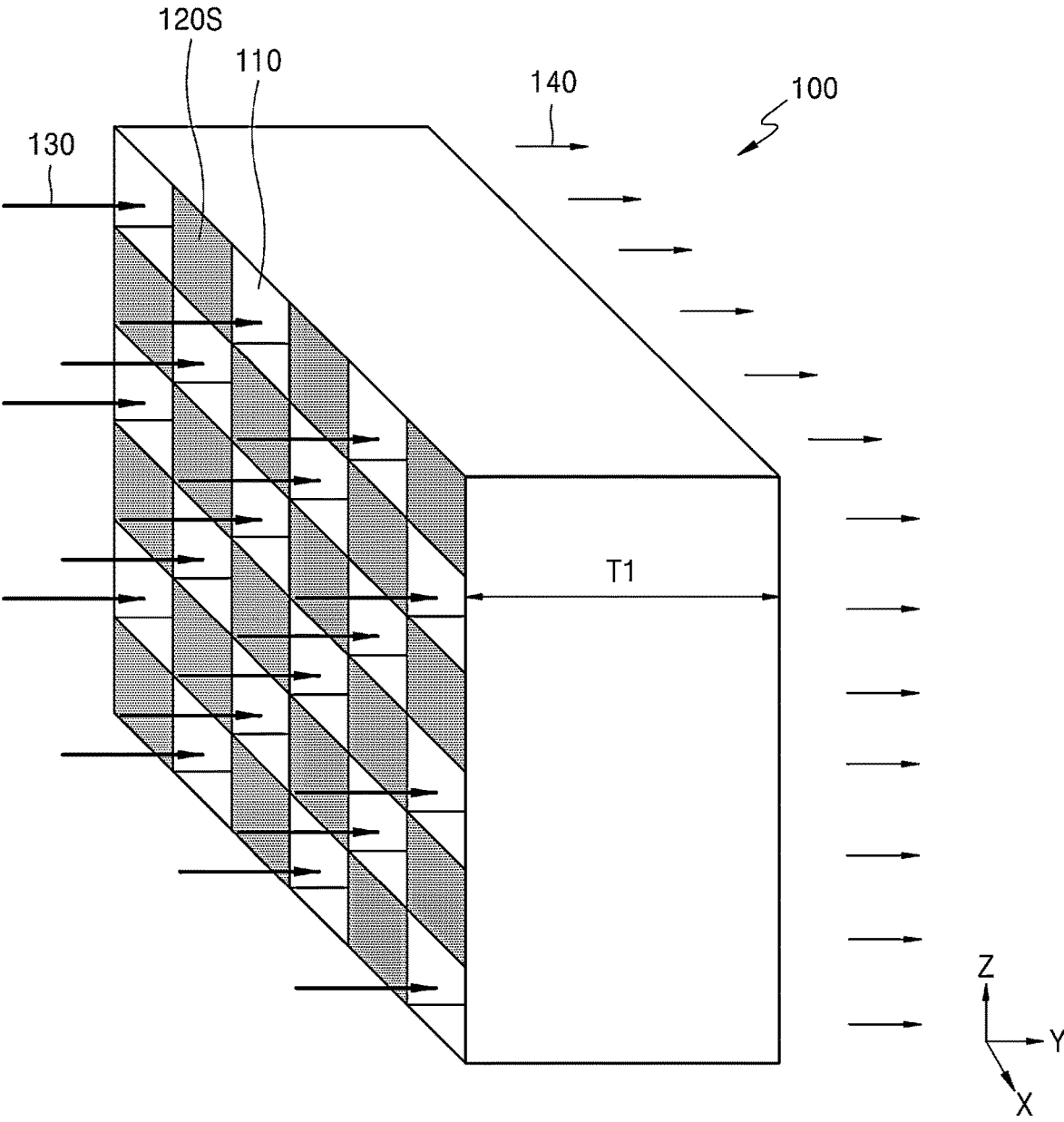
FIG. 17 is a three-dimensional view of a ceramic catalyst filter according to an embodiment.

FIG. 17 shows a ceramic catalyst filter 100 according to an embodiment.

Referring to FIG. 17, the ceramic catalyst filter 100 includes an inlet surface through which a material 130 enters and a discharge surface through which a gas 140 is discharged. The material 130 may include at least two materials to be filtered or removed. For example, the material 130 may include a particulate first material and a gaseous second material. The ceramic catalyst filter 100 may have a predetermined thickness T1 in a direction (Y direction) in which the gas 140 generated as a result of a catalyst reaction of the ceramic catalyst filter 100 with a part of the material 130 is discharged. The ceramic catalyst filter 100 includes a plurality of first grooves 110 each having an inlet at a side where the material 130 enters and a bottom at a side opposite to the inlet in the Y direction. The material 130 enters the ceramic catalyst filter 100 through the plurality of first grooves 110. The plurality of first grooves 110 are regularly arranged. The plurality of first grooves 110 may be arranged in parallel to each other. The ceramic catalyst filter 100 includes a plurality of first surfaces 120S at the side where the material 130 enters. The plurality of first surfaces 120S are regularly arranged. The plurality of first surfaces 120S are arranged between the plurality of first grooves 110. That is, each of the first surfaces 120S is between the plurality of first grooves 110 in both horizontal and vertical directions. In other words, each of the first grooves 110 is between the plurality of first surfaces 120S in both horizontal and vertical directions. Each of the first groove 110 is surrounded by four first surfaces 120S, and each of the first surfaces 120S is surrounded by four first grooves 110.

Figure 18:
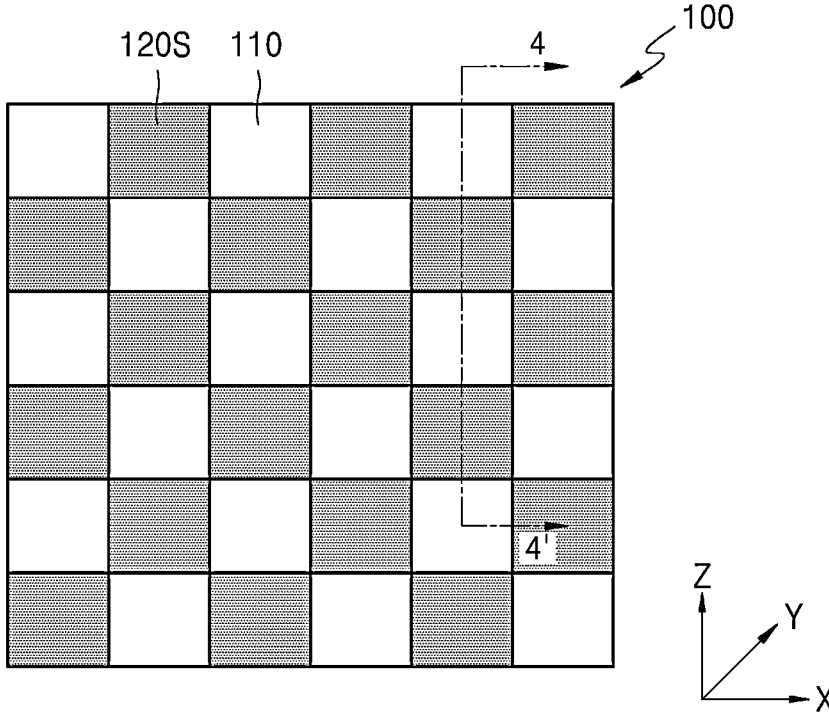
FIG. 18 is a front view of an air inlet surface of the ceramic catalyst filter of FIG. 17.

FIG. 18 is a front view of an air inlet surface of the ceramic catalyst filter 100 shown in FIG. 17.

Figure 19:
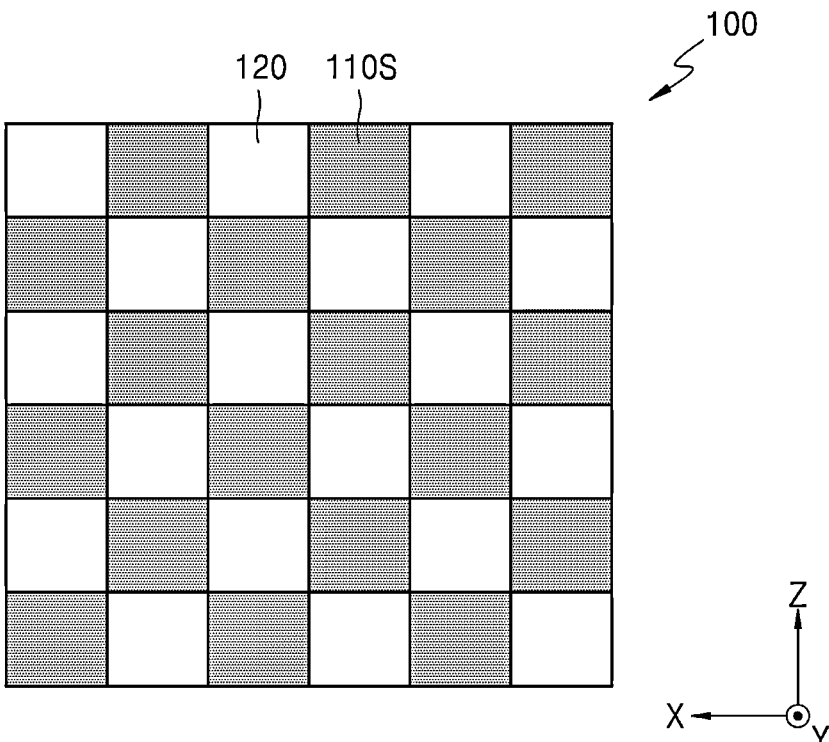
FIG. 19 is a front view of an air outlet surface of the ceramic catalyst filter of FIG. 17.

FIG. 19 shows a back surface, that is, a gas discharge surface of the ceramic catalyst filter 100.

Referring to FIG. 18 and FIG. 19, the ceramic catalyst filter 100 is shown including a plurality of second grooves 120 and a plurality of second surfaces 110S at a side where a gas is discharged. The plurality of second grooves 120 may be outlets through which a gas flows out. The gas discharged through the plurality of second grooves 120 may be a relatively clean or innoxious gas as a product of filtering a harmful material or impurities from the material 130 that has entered through the plurality of first grooves 110, or may include this gas and the air. The plurality of second grooves 120 are regularly arranged. The plurality of second surfaces 110S are also regularly arranged. An arrangement relation between the plurality of second grooves 120 and the plurality of second surfaces 110S may follow an arrangement relation between the plurality of first grooves 110 and the plurality of first surfaces 120S. The plurality of second surfaces 110S respectively correspond to the plurality of first grooves 110, and the plurality of second grooves 120 respectively correspond to the plurality of first surfaces 120S.

Referring to FIGS. 17 and 19 together, the second surfaces 110S may be the bottoms of the first grooves 110, and the first surfaces 120S may be the bottoms of the second grooves 120.

FIG. 19 is a cross-sectional view taken along line 4-4' of FIG. 18.

The ceramic catalyst filter 100 may be a single body structure or a single body frame. The ceramic catalyst filter 100 may have a frame formed of a same material (e.g., a ceramic material, a catalyst material, or the like) as a whole. The ceramic catalyst filter 100 is a single body entirely connected as one, but will be described by separation into a horizontal part and a vertical part for the convenience of description.

Figure 20:
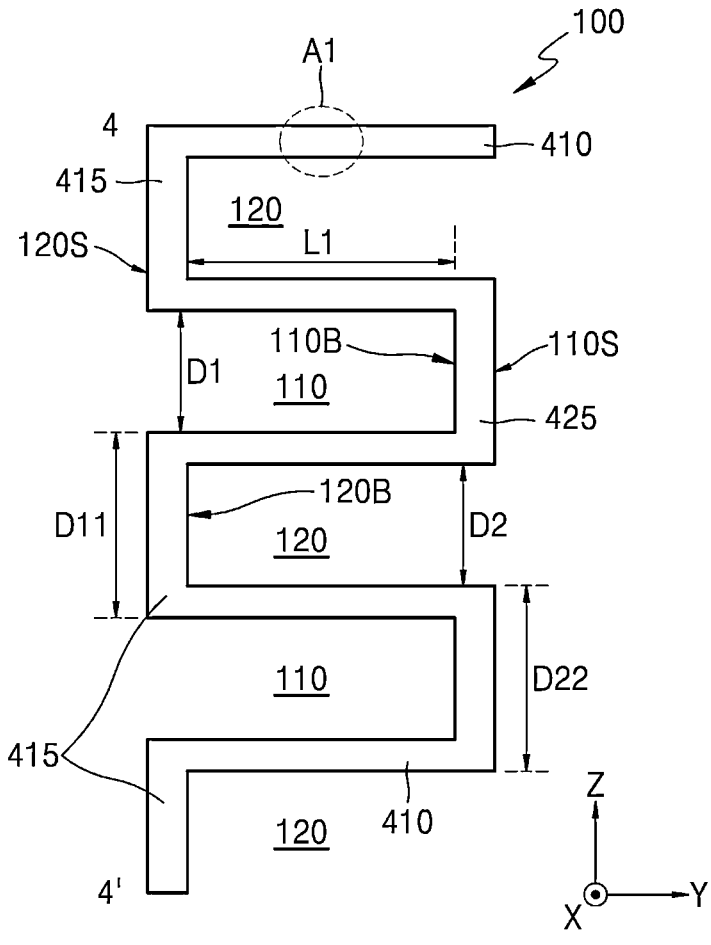
FIG. 20 is a cross-sectional view taken along line 4-4' of FIG. 18.

Referring to FIG. 20, the ceramic catalyst filter 100 may be a structure having a frame in which the plurality of first and second grooves 110 and 120 are sequentially stacked in a Z-axis direction.

For example, the ceramic catalyst filter 100 includes a plurality of horizontal parts 410 and a plurality of vertical parts 415 and 425. The plurality of horizontal parts 410 are spatially spaced apart from each other in the Z-axis direction. Here, the Z-axis direction will be referred to as a vertical direction for the convenience of description. The plurality of horizontal parts 410 are parallel to each other in a Y-axis direction. A length of each of the plurality of horizontal parts 410 may be the same. The Y-axis direction may be a direction in which the gas 140 produced as a result of a catalyst reaction is discharged. The Y-axis is perpendicular to the Z-axis. Here, for the convenience of description, the Y-axis direction is considered as a horizontal direction. The plurality of vertical parts 415 and 425 are parallel to each other and spatially spaced apart from each other. The plurality of vertical parts 415 and 425 are alternately arranged between the plurality of horizontal parts 410. The plurality of horizontal parts 410 are also alternately arranged between the plurality of vertical parts 415 and 425. The plurality of horizontal parts 410 are connected to each other through the plurality of vertical parts 415 and 425. The plurality of vertical parts 415 and 425 are parallel to each other and spatially spaced apart from each other. The plurality of vertical parts 415 and 425 are connected to each other through the plurality of horizontal parts 410. The plurality of vertical parts 415 and 425 include a plurality of first vertical parts 415 and a plurality of second vertical parts 425. The plurality of first vertical parts 415 and the plurality of second vertical parts 425 are spaced apart from each other in the Y-axis direction. The plurality of first vertical parts 415 are spaced apart from each other in the Z-axis direction and are aligned side-by-side in the Z-axis direction. The plurality of second vertical parts 425 are also spaced apart from each other in the Z-axis direction and aligned side-by-side in the Z-axis direction. The plurality of first vertical parts 415 are at a side where the material 130 enters. The plurality of second vertical parts 425 are at a side where the gas 140 produced by a catalytic reaction is discharged.

The plurality of horizontal parts 410 may be walls of the first and second grooves 110 and 120. That is, the plurality of horizontal parts 410 are each between the first groove 110 and the second groove 120, and thus, are a boundary between the first and second grooves 110 and 120. The walls mean side walls of the first and second grooves 110 and 120. Thicknesses of the plurality of horizontal parts 410 may be the same or may be different from each other in some thereof. The thickness of the plurality of horizontal parts 410 may be the same as or different from the thickness of the plurality of vertical parts 415 and 425. The horizontal parts 410 as the walls of the first grooves 110 are spaced apart from each other by a first distance D1 in the Z-axis direction. The horizontal parts 410 as walls of the second grooves 120 are spaced apart from each other by a second distance D2 in the Z-axis direction. In an embodiment, the first and second distances D1 and D2 may be the same. That is, the diameters of inlets of the first and second grooves 110 and 120 may be the same as each other. The Y-axial lengths L1 of the plurality of horizontal parts 410 may be the same as each other. The depths of the first and second grooves 110 and 120 may be determined by the Y-axial lengths L1 of the horizontal parts 410. Therefore, the depths of the first and second grooves 110 and 120 may be the same as each other. In an embodiment, the depths of the first grooves 110 and the depths of the second grooves 120 may be different from each other. The plurality of first vertical parts 415 may be the bottoms of the second grooves 120. The plurality of second vertical parts 425 may be the bottoms of the first grooves 110. An air permeability of the bottoms of the first grooves 110 may be different from that of the bottoms of the second grooves 120. The bottoms of the second grooves 120 may have a structure that blocks a gaseous material. A diameter D11 of the first vertical part 415 and a diameter D22 of the second vertical part 425 may be the same as each other. Y-axial thicknesses of the first and second vertical parts 415 and 425 may be the same as each other.

The plurality of horizontal parts 410 and the plurality of vertical parts 415 and 425 may be a single body connected with each other as one, and may be a material layer of ceramic type formed of a same catalyst material or catalytic material.

In the case of using a single body of a ceramic material, the catalytic material may vary according to the energy supplied to the ceramic catalyst filter 100 for activation of the catalytic material.

In an embodiment, when the energy supplied to the ceramic catalyst filter 100 is light energy the catalyst material may be a metal compound capable of causing a photo-catalyst reaction, and for example, may be $TiO_2$ or $WO_3$. The light energy may include ultraviolet energy or visible light energy.

In an embodiment, when the energy supplied to the ceramic catalyst filter 100 is electric energy of direct current (DC) or alternating current (AC), the catalyst material may be a metal compound capable of performing an oxygen reduction reaction (ORR) of an electric conductivity at the plurality of horizontal parts 410 and the plurality of vertical parts 415 and 425. Here, the metal compound may be a compound containing a metal such as cobalt, nickel, or manganese or may include a noble metal oxide.

In an embodiment, when the energy supplied to the ceramic catalyst filter 100 is ion energy, the catalyst material may be a metal compound that allows ozone oxidation, and, for example, may be $MnO_2$ or $ZnO_2$. For example, the ion energy may be plasma energy.

In an embodiment, when the energy supplied to the ceramic catalyst filter 100 is thermal energy, the catalyst material may be a material compound capable of performing a low-temperature oxidation reaction. In an embodiment, the metal compound may be a compound containing Cu, Co, Ni, Fe, Al, Si, or a noble metal. The low-temperature oxidation reaction denotes an oxidation reaction that occurs in a temperature range of room temperature to 100° C. For example, the thermal energy may include infrared energy or energy supplied from a heat source such as a heater.

The energy supplied to the ceramic catalyst filter 100 may be energy activating at least the horizontal parts 410 and further some or all the vertical parts 415 and 425 to cause a catalytic reaction of a gas component included in the material 130. By the supply of the energy, a catalyst layer is formed on the surface of the ceramic catalyst filter onto which the energy is irradiated. The surface on which the energy is irradiated may be the sides or the bottoms of the second grooves 120. The catalyst layer is a region (layer) activated by the energy supply. A gas component included in the material 130 may generate a catalyst reaction (e.g., by reacting with oxygen when optical energy is supplied to the material 130) while passing through the catalyst layer and may be decomposed. The gas component may be a VOC or another harmful gas. Examples of the VOC may be form-aldehyde, acetaldehyde, ammonia, toluene, or acetic acid.

Figure 21:
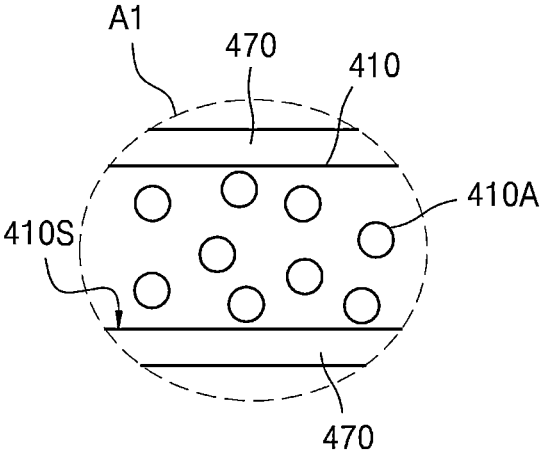
FIG. 21 is an enlarged cross-sectional view of a first part A1 of FIG. 20.

FIG. 21 is an enlarged view of a first part A1 of the horizontal part 410 of FIG. 20.

Referring to FIG. 21, the horizontal part 410 includes pores 410A. In an embodiment, the vertical parts 415 and 425 may not include pores.

In an embodiment, the vertical parts 415 and 425 may include pores, but a pore density of the vertical parts 415 and 425 may be lower than that of the horizontal parts 410.

In an embodiment, the first vertical parts 415 may include pores, and the second vertical parts 425 may not include pores.

In an embodiment, the first and second vertical parts 415 and 425 may include pores, and a pore density of the second vertical parts 425 may be lower than that of the first vertical parts 415.

Referring to FIG. 21, both surfaces of the horizontal part 410 are provided with photocatalyst thin films 470 described above. One surface of the horizontal part 410 is an energy-irradiated surface 410S of the horizontal part 410. A material of the horizontal part 410 may be different from that of the photocatalyst thin films 470 covering both surfaces of the horizontal part 410. The horizontal part 410 may be formed of a ceramic material that is different from the material of the photocatalyst thin films 470. In an embodiment, the horizontal part 410 may be formed of a catalytic material that is different from the material of the photocatalyst thin films 470. For example, the horizontal part 410 may be formed of a catalyst material that is different from the material of the photocatalyst thin film 470 and may be activated by energy (for example, thermal energy) selected from the four types of energy described above. In this case, two different types of energy, i.e., the energy capable activating the photocatalyst thin film 470 and the energy capable of activating the horizontal part 410 may be simultaneously supplied.

Figure 22:
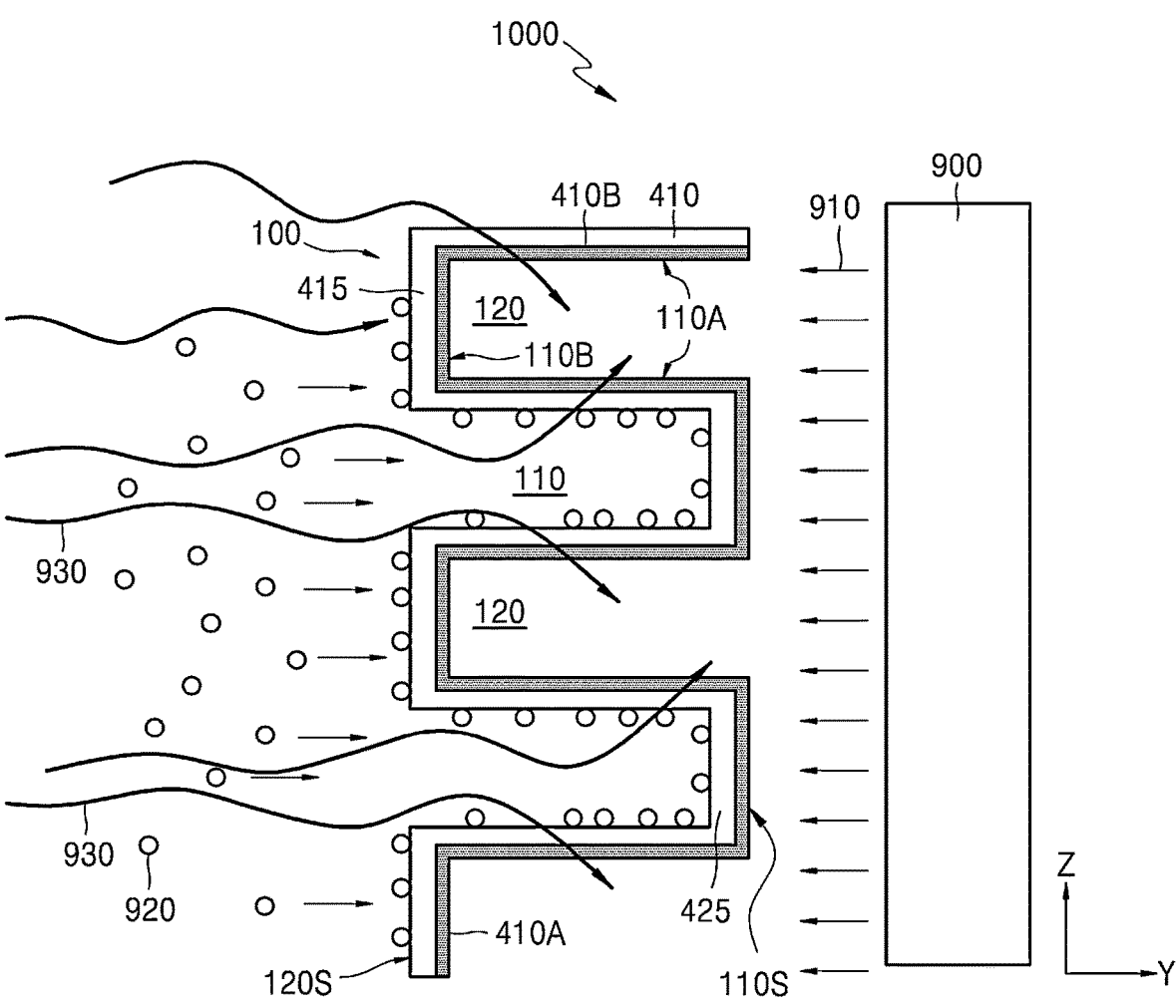
FIG. 22 is a cross-sectional view of a filtering system including the ceramic catalyst filter according to an embodiment.

FIG. 22 shows a filtering system 1000 including the recyclable ceramic catalyst filter according to an embodiment.

Referring to FIG. 22, the filtering system 1000 includes a ceramic catalyst filter 100 and an energy supply unit 900. The energy supply unit 900 generates energy that activates a surface of the ceramic catalyst filter 100 through which air is discharged, i.e., a surface directly exposed to the energy supplied from the energy supply unit 900. Energy 910 generated from the energy supply unit 900 is irradiated onto the side walls 110A and the bottom surfaces 110B of second grooves 120 of the first catalyst filter 100, and the second surfaces 110S of the first catalyst filter 100. Because a catalyst layer 410B is formed on at least the side walls 110A and the bottom surfaces 110B of the second grooves 120, and the second surfaces 110S of the first catalyst filter 100, the energy-irradiated surfaces of the side walls 110A and the bottoms 110B of the second grooves 120, and the second surfaces 110S may be activated.

In the filtering system 1000 with such a mechanism described above, a filtering process of a first material 920 and a second material 930, which enter the first catalyst filter 100, i.e., a process of removing the first material 920 and the second material 930, will be described. The first material 920 may include a particulate material. For example, the first material 920 may include particles. The particles may be, for example, particles having a diameter of 10 μm or less, i.e., fine particles having PM10 or less. PM refers to "particulate matter," with PM10 being inhalable particles, with diameters that are generally 10 micrometers and smaller, and PM2.5 being fine inhalable particles, with diameters that are generally 2.5 micrometers and smaller. The fine particles may include, for example, fine dust. The second material 930 may include a gaseous material, and may include, for example, VOC as described above. The second material 930 may include an organic compound. The first material 920 as a particulate may not penetrate the horizontal part 410, which is a wall between the first and second grooves 110 and 120 and may not penetrate the first and second vertical parts 415 and 425, and thus, may accumulate on a wall of the first groove 110. The side walls and the bottom of the first groove 110 and a first surface 120S of the first vertical part 415 may collectively be referred to as a first surface of the ceramic catalyst filter 100 that filters out the first material 920.

At least the horizontal part 410 of the ceramic catalyst filter 100 may be a porous material layer including pores 140A. Therefore, the second material 930 as a gas may flow into the second groove 120 at least through the horizontal part 410, i.e., the side wall of the first groove 110. During this process, the second material 930 may cause a catalytic reaction while passing a catalyst layer 410B, and thus may be decomposed. For example, when the second material 930 includes formaldehyde (HCHO), the formaldehyde may cause a catalytic reaction with oxygen present in the second groove 120 while the formaldehyde passes the catalyst layer 410B, and thus may be decomposed into water and carbon dioxide ($CO_2$). Thus, the formaldehyde may be removed.

The energy supplied from the energy supply unit 900 may include light energy source that supplies light energy at a wavelength band from an ultraviolet band to a visible band, an ion energy source that supplies plasma, or a thermal energy source that supplies thermal energy in the form of infrared light. When plasma is supplied, the second material 930 may cause a catalytic reaction with ozone present in the second groove 120, and thus may be decomposed.

Hereinafter, a method of managing a filtering system including the recyclable ceramic catalyst filter according to an embodiment (hereinafter, also referred to as "a first management method") will be described.

Figure 23:
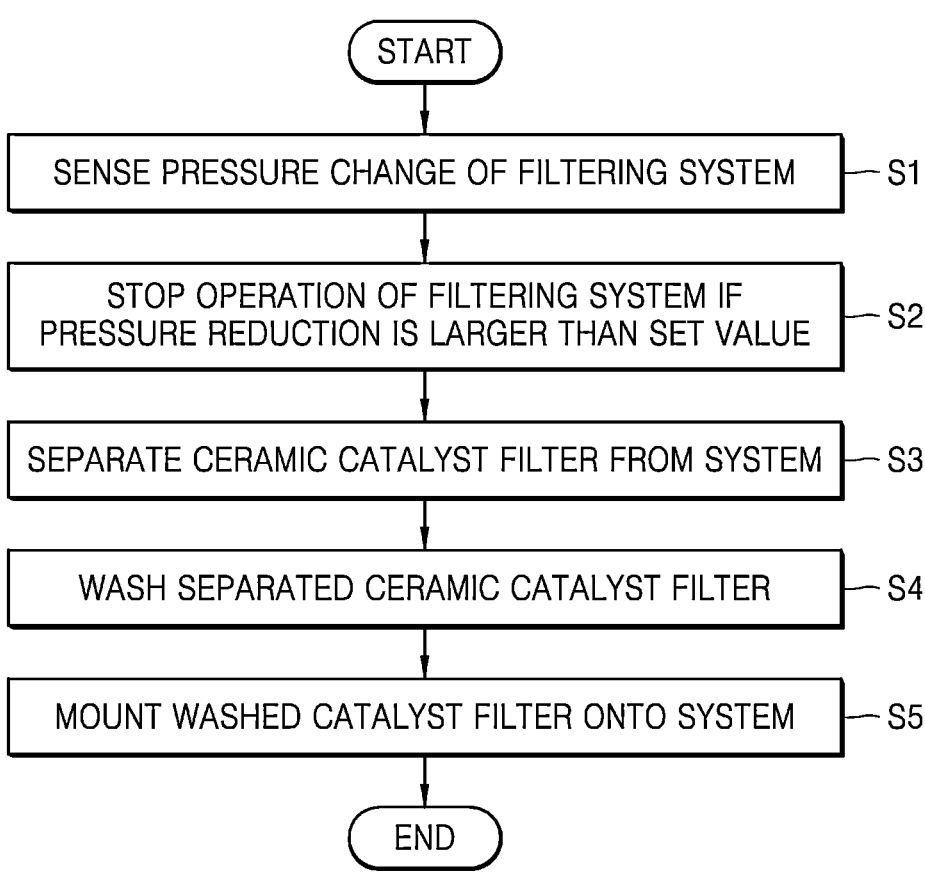
FIG. 23 is a flowchart illustrating each step of a management method of the filtering system including the ceramic catalyst filter, according to an embodiment.

Referring to FIG. 23, initially, the first management method detects a pressure change of the filtering system (S1). Next, once the pressure change is detected, when a pressure reduction is greater than a predetermined value, operation of the filtering system is stopped (S2). Here, stopping the operation thereof may include stopping the entire operation by turning the power of the filtering system off and stopping only the filtering operation while maintaining a basic pre-operation (e.g., a simple air blowing operation) of the filtering system. Also, the pressure reduction may refer to a pressure reduction at an air discharge side of the ceramic catalyst filter. The detecting of the pressure change may include detecting a pressure difference between an air inlet and an air outlet of the catalyst filter. Based on the pressure difference, when the pressure difference is greater than or equal to a reference value, e.g., 250 Pascal (Pa) or greater, the operation of the filtering system may be stopped.

After stopping the filtering system, the ceramic catalyst filter is separated from the filtering system (S3). Then, the separated ceramic catalyst filter is washed (S4). When the amount of the particulate first material 920 accumulated on the side walls and bottom of the grooves (e.g., the first grooves 610 in FIG. 22) at the air inlet side of the ceramic catalyst filter is greater than or equal to a reference amount, the pressure may decrease or the pressure difference may increase to be higher than or equal to a reference value. Thus, in the washing operation (S4), the separated ceramic catalyst filter may be washed by using water or another predetermined solvent or solution to remove the accumulation, i.e., a particle cake on the catalyst filter.

After the washing of the ceramic catalyst filter, the washed ceramic catalyst filter is mounted again on the filtering system (S5).

Hereinafter, a method of managing a filtering system including the recyclable ceramic catalyst filter according to an embodiment (hereinafter, also referred to as "a second management method") will be described.

Figure 24:
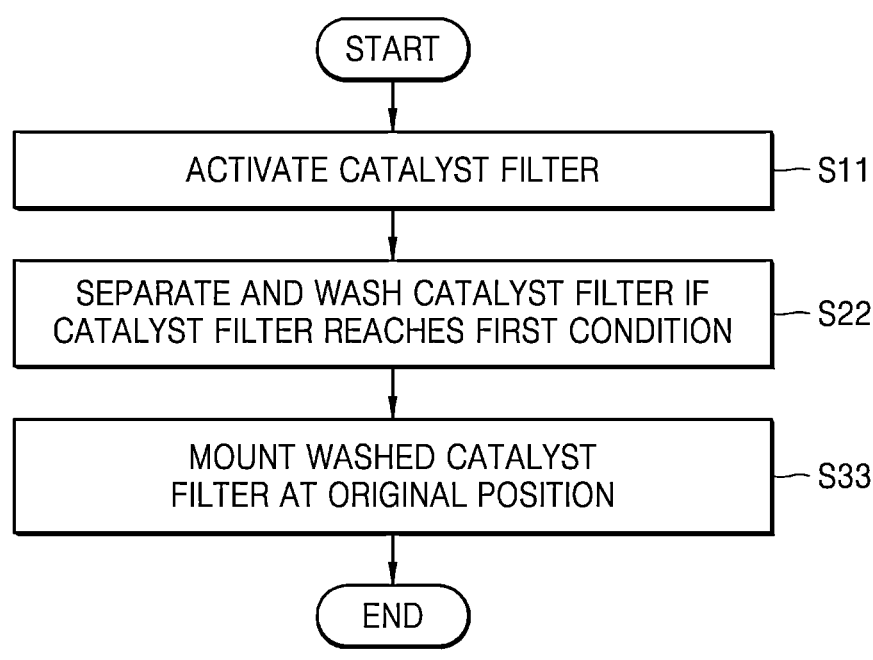
FIG. 24 is a flowchart illustrating each step of a management method of the filtering system including the ceramic catalyst filter, according to an embodiment.

Referring to FIG. 24, first, the second management method activates the ceramic catalyst filter in the filtering system (S11). The activating of the ceramic catalyst filter (S11) may be performed by supplying energy to the catalyst filter from the energy supply unit 900 as described above.

Then, when the ceramic catalyst filter reaches a first condition, the ceramic catalyst filter is separated and washed (S22). The first condition may be a pressure-related condition described in connection with FIG. 22. After the washing of the ceramic catalyst filter, the washed ceramic catalyst filter is mounted to the original position thereof (S33).

The ceramic catalyst filter according to an embodiment may be manufactured by coating a photocatalyst thin film having a uniform nanostructure over a large area by using a simple one-pot type method.

A method of manufacturing the ceramic catalyst filter according to an embodiment includes: preparing a self-assembly polymer and a photocatalyst precursor; coating a ceramic filter with a coating solution, the ceramic filter being a single body structure having a first surface blocking a first material and a second surface removing the second material passing through the first surface, by dipping the ceramic filter in the coating solution; and drying and then heat-treating the ceramic filter coated with the coating solution.

Filter catalyst coating for application to a recyclable filter may have several limitations. In the case of sol-gel dip coating, it may be difficult to coat a catalyst thin and to control the shape and structure of the coating. In addition, due to the viscosity of sol, the uniformity of coating decreases, and effective coating may be difficult. With these drawbacks, it may be difficult to implement a catalyst with sufficient activity. In the case of coating using an organic binder, which is a method of, after synthesis of a catalyst, attaching the catalyst to the surface of a filter by using an organic binder having adhesiveness, there is a limitation more processes may be used. In addition, there is a drawback that the organic binder not sufficiently removed after the process may emit harmful material during pyrolysis and photolysis.

However, a method of manufacturing the ceramic catalyst filter according to an embodiment may uniformly coat a photocatalyst thin film having a nanostructure over a large area, from the outer wall to inner wall surfaces of the ceramic filter having a three-dimensional (3-D) structure having a complex inner structure without using a binder, by a one-pot type simple process using a self-assembly polymer. In addition, because an additional adhesive is not used, a recyclable ceramic catalyst filter may be manufactured through washing, photolysis, and pyrolysis, without the discharge of harmful material.

To coat the photocatalyst thin film on the ceramic filter surface, a coating solution including a self-assembly polymer is used. The self-assembly polymer forms a nano arrangement structure by self-assembly behaviors after coated on the ceramic filter, and thus, a photocatalyst thin film having a nanostructure in which grains in a nanometer scale form a worm-like alignment structure may be obtained on the ceramic filter surface.

In an embodiment, the self-assembly polymer may include:

i) a copolymer including a polyethylene oxide (PEO) block, a polypropylene oxide (PPO) block, a polystyrene (PS) block, and a polybutylene (PB) block, or a combination thereof;

ii) a polymer including an acrylate-based polymer, a cellulose-based polymer, or polystyrene; or iii) a combination thereof.

For example, the self-assembly polymer may include PEO-PPO, PEO-PPO-PEO, PPO-PEO-PPO, PS-PEO-PS, PS-PB-PS, or a combination thereof.

In an embodiment, the self-assembly polymer may be a block copolymer including of a PEO block and a PPO block, and an amount of the PEO block may be 50 to 90 weight percent (wt %), and an amount of the PPO block may be 10 to 50 wt %, each based on a total weight of the block copolymer. The self-assembly polymer having the PEO block and the PPO block within the disclosed amount ranges exhibits excellent self-assembly behavior, and by using the self-assembly polymer, a nano alignment structure may be formed well, after coating on the ceramic filter, thus enabling a uniform photocatalyst thin film to be coated on the inner and outer surfaces of the ceramic filter thin film through heat treatment. As the self-assembly polymer, commercialized products such as Pluronic F68, F108, F127, and the like may be used.

After a coating solution including the self-assembly polymer and photocatalyst precursors is prepared, a ceramic filter, which is a single body structure having a first surface blocking the first material and a second surface removing the second material passing the first surface, is coated by being dipped in the coating solution.

The dipping of the ceramic filter may be performed using a one-pot type method. By a one-pot synthesis method, a photocatalyst thin film having a nanostructure may be uniformly formed as a thin film on the inner wall and outer wall surfaces of the ceramic filter.

The drying may be performed, for example, in a vacuum oven at a temperature of 70° C. to 100° C., and the heat treatment may be performed, for example, in a furnace at a temperature of 400° C. to 800° C. Through the drying process, the solvent is removed from the coating solution coated on the ceramic filter surface, the coating solution including the self-assembly polymer, resulting in the ceramic filter surface on which the self-assembly polymer and the photocatalyst precursor are uniformly coated. Through the heat treatment process, the self-assembly polymer is removed by pyrolysis while the photocatalyst is synthesized from the photocatalyst precursor, and thus, a photocatalyst thin film having a nanostructure including grains in a nanometer scale forming a worm-like alignment structure may be obtained.

One or more embodiments of the present disclosure will now be described in detail with reference to the following examples. However, these examples are only for illustrative purposes and are not intended to limit the scope of the one or more embodiments of the present disclosure.

EXAMPLES

Example 1

A ceramic filter as shown in FIG. 1 was used for coating. The ceramic filter includes a Cordierite's ceramic material, and the thickness of each cell is 0.2-0.5 millimeters (mm) and the thickness between inner walls is 1-3 mm. The ceramic filter has a rectangular shape or cylindrical shape with a length of 6-10 centimeters (cm).

To coat the ceramic filter, a mixture of 0.9 grams (g) of Pluronic® F-108 as a self-assembly polymer, 0.69 milliliters (mL) of $TiCl_4$ as a photocatalyst precursor, and 6 mL of a solvent was prepared in a reaction vessel, and the ceramic filter was dipped in the coating solution for 30 minutes.

After the ceramic filter was removed, the ceramic filter coated with the coating solution was dried in a vacuum oven at 80° C. for 1 hour, and then heat-treated in a furnace at 450° C. for 5 hours. The temperature increasing rate of the furnace was controlled to 1° C./minute (min).

After the heat treatment, a ceramic catalyst filter coated with a $TiO_2$ photocatalyst thin film having a nanostructure was obtained. The catalytic amount of the $TiO_2$ photocatalyst was 9.02 grams per liter (g/L), and the grain size thereof was about 15 nanometers (nm).

Example 2

A ceramic catalyst filter coated with a $TiO_2$ photocatalyst thin film having a nanostructure was obtained by performing the same process as in Example 1, except that Pluronic® F-68 as a self-assembly polymer was used.

Example 3

A ceramic catalyst filter coated with a $TiO_2$ photocatalyst thin film having a nanostructure was obtained by performing the same process as in Example 1, except that Pluronic® F-127 was used as the self-assembly polymer.

Example 4

BiOBr particles (~30 nm) as a cocatalyst was deposited on a surface of the ceramic catalyst filter coated with the $TiO_2$ photocatalyst thin film having a nanostructure, obtained in Example 1.

Comparative Example 1

A ceramic catalyst filter was manufactured in which $TiO_2$ particles (SG-TOP25SW) of Sukgyung AT Co., Ltd. were coated in a catalytic amount of 106 g/L using an epoxy-based organic binder, without using a self-assembly polymer.

Comparative Example 2

A ceramic catalyst filter was manufactured by performing the same process as in Comparative Example 1, except that the catalytic amount of the $TiO_2$ particles was changed to 86 g/L.

Comparative Example 3

A ceramic catalyst filter was manufactured by performing, on the ceramic filter surface, sol-gel coating by heat treatment after dip-coating with a gel including a $TiO_2$ precursor, without using a self-assembly polymer.

Comparative Example 4

A ceramic catalyst filter was prepared by performing the same process as in Comparative Example 1, except that $TiO_2$ particles were coated using commercial $TiO_2$ particles (ST-01, ISHIHARA SANGYO KAISHA, LTD.) in a catalytic amount of 30 g/L.

Evaluation Example 1: Scanning Electron Microscopy (SEM) Analysis

The nanostructure of the ceramic catalyst filter manufactured in Example 1 was analyzed by SEM before and after coating of the $TiO_2$ thin film. The results are shown in FIG. 2.

Figure 2:
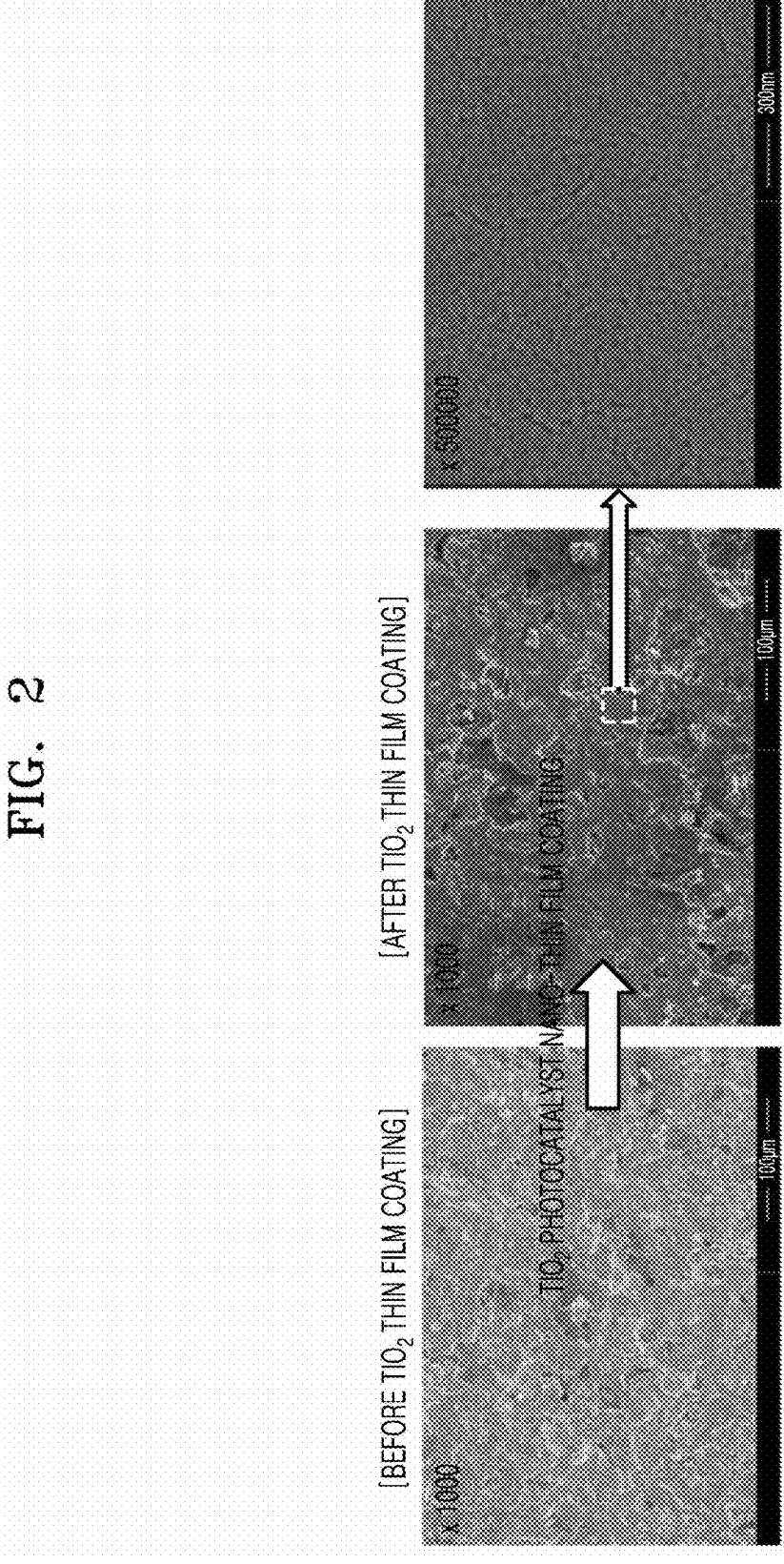
FIG. 2 shows results of scanning electron microscope (SEM) analysis of a nanostructure before and after coating of a $TiO_2$ thin film of a ceramic catalyst filter manufactured in Example 1.

As shown in FIG. 2, it was found that the coated $TiO_2$ thin film of the ceramic catalyst filter had a worm-like nanostructure due to the self-assembly polymer and was coated uniformly over a large area (coating amount: 9.02 g/L, and coated-grain size: ~15 nm).

Evaluation Example 2: X-Ray Diffraction (XRD) and Bandgap Evaluation

Figure 3:
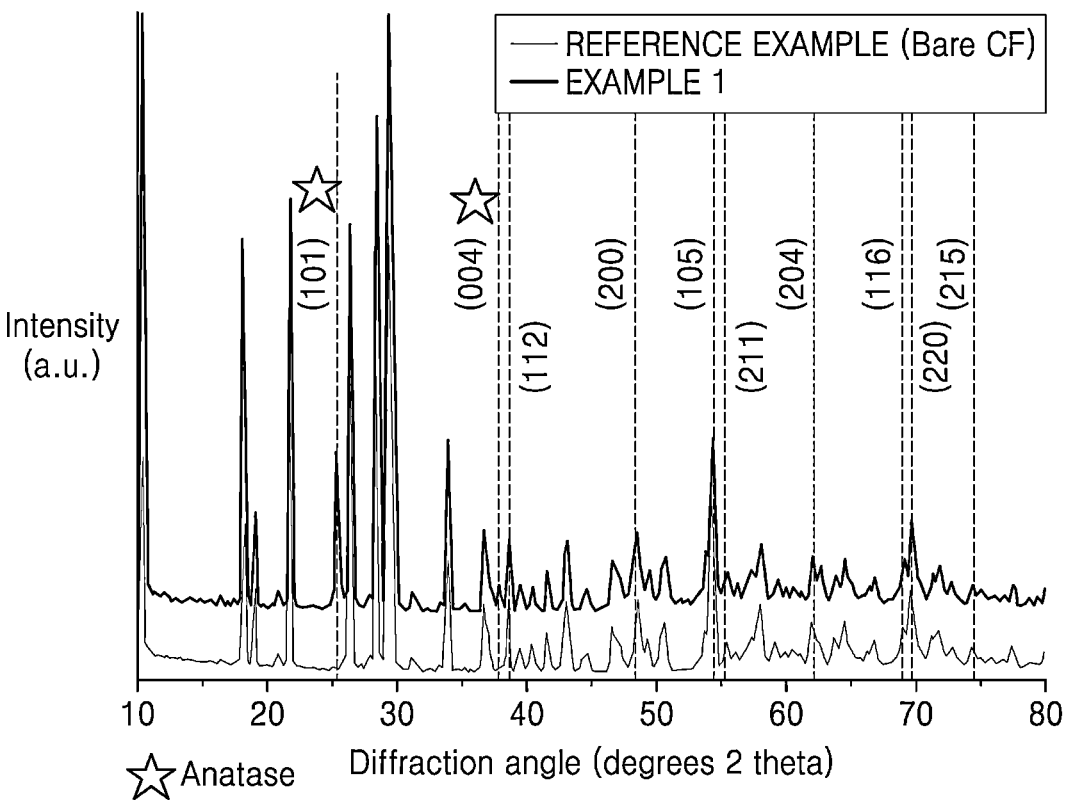
FIG. 3 is a graph of intensity (arbitrary units (a.u.)) versus diffraction angle (degrees 2 theta) showing X-ray diffraction (XRD) analysis results of a reference Example (Bare ceramic filter (CF)) and a nanostructure photocatalyst thin film coated in the ceramic catalyst filter manufactured in Example 1.
Figure 4:
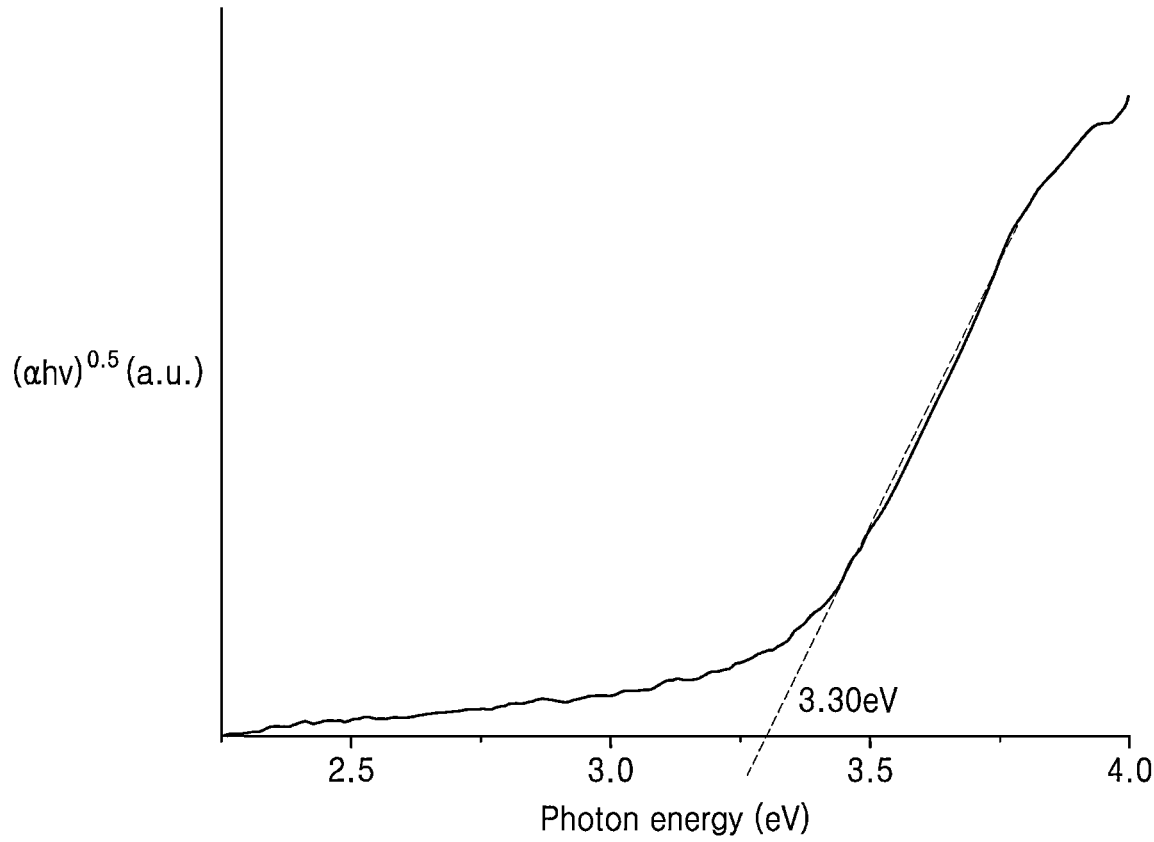
FIG. 4 is a graph of $(\alpha h v)^{0.5}$ (a.u.) (wherein a is the absorption coefficient, h is Planck's constant, and v is the frequency of light) versus photon energy (electronvolts (eV)) showing bandgap analysis of the nanostructure photocatalyst thin film coated in the ceramic catalyst filter manufactured in Example 1.

The results of XRD and bandgap evaluations of the nanostructure photocatalyst thin film of the ceramic catalyst filter manufactured in Example 1 are shown in FIGS. 3 and 4, respectively.

(2) Particle Removal Rate

The particle removal rate was calculated by measuring the particle concentration using a particle concentration counter (OPS3330).

(3) Differential Pressure

The differential pressure was measured by measuring the pressure difference before and after the filtering, using a differential pressure sensor (SETRA 264).

TABLE 1

| | | | | Filter performance | | |
|---|---|---|---|---|---|---|
| | Coating method | Catalytic amount (g/L) | Polymer used | Photolysis rate (%) | Particle removal rate (%) | Differential pressure (Pascals (Pa)) |
| Example 1 | One-pot coating using polymer | 9.02 | F108 | 14.13 | 53.1 | 117.7 |
| Example 2 | One-pot coating using polymer | — | F68 | 14.80 | 59.3 | 102.4 |
| Example 3 | One-pot coating using polymer | — | F127 | 14.66 | 63.4 | 113.1 |
| Example 4 | One-pot coating using polymer + cocatalyst (BiOBr) | 9.02 | F108 | 22.60 | — | — |
| Comparative Example 1 | TiO$_2$-coating with adhesive (organic binder) | 106 | X | 13.29 | 51.5 | 132.6 |
| Comparative Example 2 | TiO$_2$-coating with adhesive (organic binder) | 86 | X | 15.95 | 56.2 | 146.2 |
| Comparative Example 3 | Sol-gel coating | — | X | — | — | — |
| Comparative Example 4 | TiO$_2$-coating with adhesive (organic binder) | 30 | X | — | 56.7 | 209.3 |

As shown in FIGS. 3 and 4, the ceramic catalyst filter was found to include TiO$_2$ in an anatase phase with a bandgap of 3.30 electronvolts (eV).

Evaluation Example 3: Filter Performance Experiment

A filter performance experiment of the ceramic catalyst filters manufactured in Examples 1 to 4 and Comparative Examples 1 to 4 was performed as follows. The results are shown in Table 1.

(1) Photolysis Rate

For volatile organic compound (VOC) removal and decomposition efficiency measurement, the degree of removal of formaldehyde as VOC by adsorption onto each of the ceramic catalyst filters in a dark reaction for 15 minutes before light irradiation was identified, and then decomposition efficiency was measured from CO$_2$ produced by light irradiation. For the experiment, the ceramic catalyst filter was fixed to a 2×2 square centimeter (cm$^2$) holder, and then light was irradiated thereon at an intensity of 50 milliwatts per square centimeter (mW/cm$^2$). The gas flow was 500 milliliters per minute (mL/min), and the initial concentration of VOC was 20 parts per million by volume (ppmv).

Figure 5:
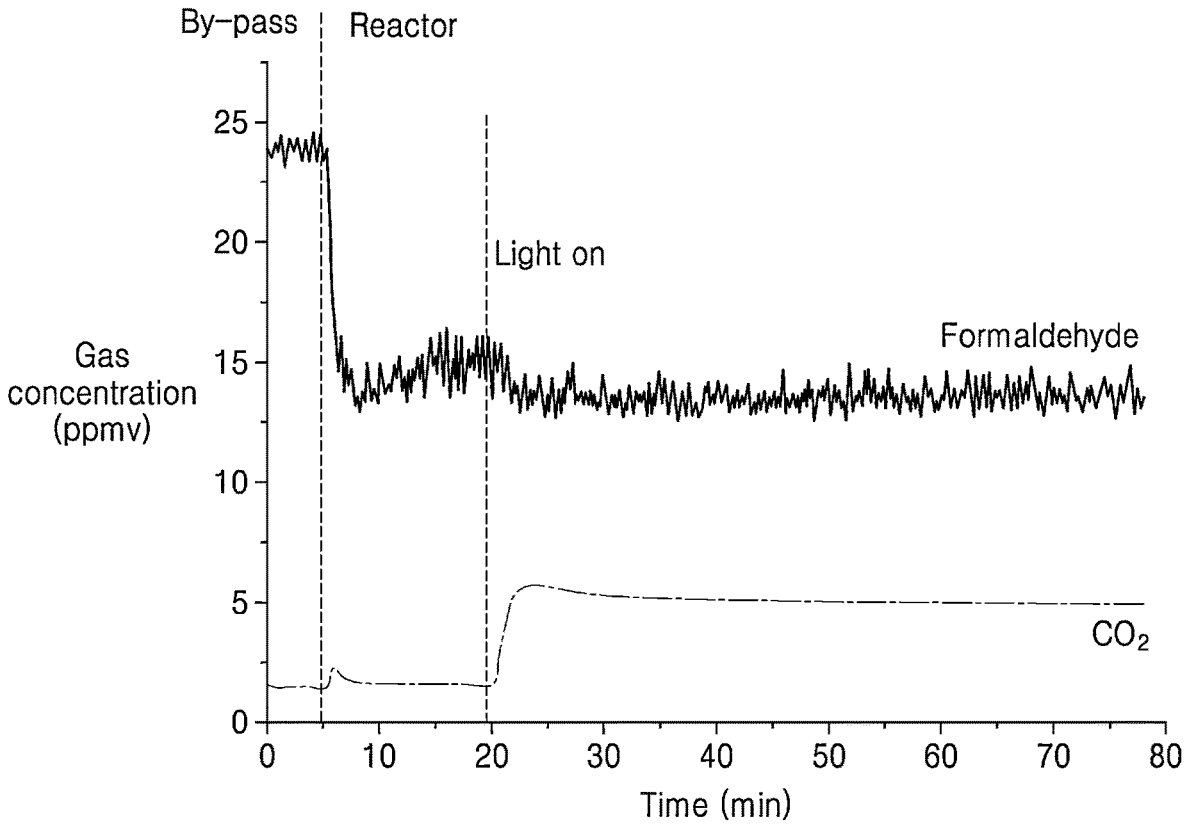
FIG. 5 is a graph of gas concentration (parts per million by volume (ppmv)) versus time (minutes (min)) showing photolysis experiment results of the ceramic catalyst filter of Example 1.

Among the results, the photolysis experiment results of the ceramic catalyst filter of Example 1 are shown in FIG. 5.

As shown in Table 1 and FIG. 5, it was found that the ceramic catalyst filter according to Example 1 was found to exhibit a photolysis efficiency of 14.13% even at a low amount of the coated catalyst (9.02 g/L). This is a similar level to those of the ceramic catalyst filter of Comparative Example 1 (catalytic amount: 106 g/L, 13.29%) and the ceramic catalyst filter of Comparative Example 2 (catalytic amount 86 g/L, 15.95%), in which the existing TiO$_2$ catalyst filter was coated with the organic binder.

Evaluation Example 4: Characteristic Analysis of Photocatalyst Thin Film According to Type of Polymer For the self-assembly polymers used in Examples 1 to 3, the total molecular weights and the amounts of PPO and PEO were different as indicated in Table 2.

TABLE 2

| Pluronic | Total MW | Content of PEO (wt. %) | MW of PPO | MW of PEO |
|---|---|---|---|---|
| F68 | 8400 | 80 | 1680 | 3160 × 2 |
| F108 | 14600 | 80 | 2920 | 5840 × 2 |
| F127 | 12600 | 70 | 3780 | 4410 × 2 |

Pluronic polymer: HO(CH$_2$—CH$_2$—O)$_n$—(CH(CH$_3$)—CH$_2$—O)$_m$—(CH$_2$—CH$_2$—O)$_n$H.

Accordingly, the ceramic catalyst filters manufactured in Examples 1 to 3 were analyzed in terms of morphological change, specific surface area, and pore characteristics of the photocatalyst thin film, and the amount of VOC adsorption, according to the used types of polymers.

Figure 6:
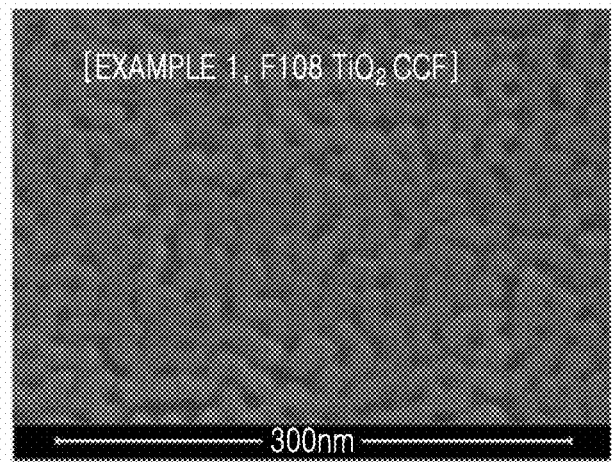
FIG. 6 is a SEM image showing the morphologies of the photocatalyst thin film of the ceramic catalyst filter (CCF) manufactured in Example 1.
Figure 7:
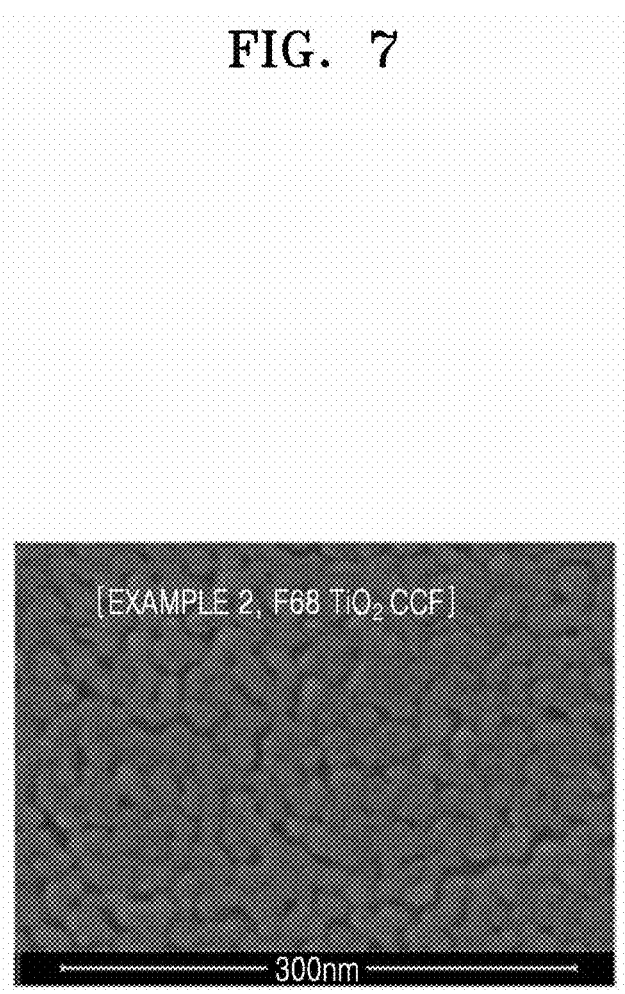
FIG. 7 is a SEM image showing the morphologies of the photocatalyst thin film of the CCF manufactured in Example 2.
Figure 8:
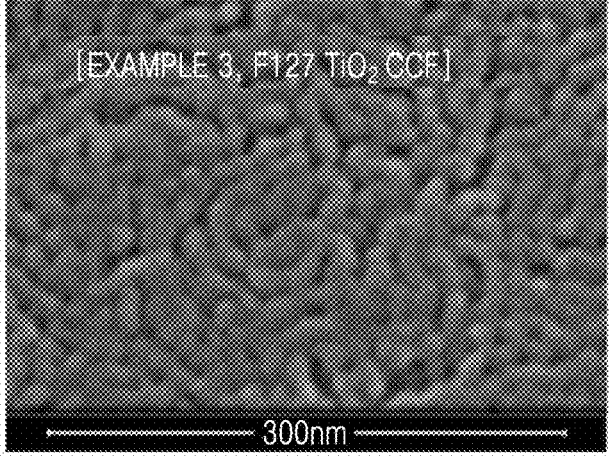
FIG. 8 is a SEM image showing the morphologies of the photocatalyst thin film of the CCF manufactured in Example 3.

FIG. 6, FIG. 7, and FIG. 8 are SEM images showing the morphologies of the photocatalyst thin films of the ceramic catalyst filters manufactured in Examples 1 to 3, respectively.

The specific surface areas and pore sizes of the ceramic catalyst filters manufactured in Examples 1 to 3, obtained through Brunauer-Emmett-Teller (BET) and Barrett-Joyner-Halenda (BJH) analyses, respectively, are shown in Table 3, and the adsorption amounts of VOC are shown in Table 4.

TABLE 3

|  | Example 1 (F108 TiO$_2$ ceramic catalyst filter (CCF)) | Example 2 (F68 TiO$_2$ CCF) | Example 3 (F127 TiO$_2$ CCF) |
| --- | --- | --- | --- |
| BET specific surface area (square meters per gram (m$^2$g$^{-1}$)) | 2.42 | 3.82 | 2.08 |
| Mesopore diameter (d$_p$, nm) | 9.21 | 4.78 | 6.18 |
| Mesopore volume (V$_p$, cubic centimeters per gram (cm$^3$g$^{-1}$)) | 14.1 × 10$^{-3}$ | 16.5 × 10$^{-3}$ | 11.0 × 10$^{-3}$ |
| Mesopore area (a$_p$, m$^2$g$^{-1}$) | 9.2 | 12.3 | 6.9 |

TABLE 4

|  | Example 1 (F108 TiO$_2$ CCF) | Example 2 (F68 TiO$_2$ CCF) | Example 3 (F127 TiO$_2$ CCF) |
| --- | --- | --- | --- |
| Adsorption amount (milligrams (mg)) | 0.102 | 0.133 | 0.071 |

As shown in FIG. 6, FIG. 7, and FIG. 8 and Tables 2 and 3, it was found that the nanostructure of the photocatalyst thin film coated on the ceramic filter changed according to the types of self-assembly polymer, and the surface area, pore size, and VOS adsorption amount of the ceramic catalyst filter changed according to the nanostructure change of the photocatalyst thin film. From this, it is expected that the light efficiency and light irradiation area of the photocatalyst thin film may be maximized by controlling the nanostructure of the photocatalyst thin film.

Figure 9:
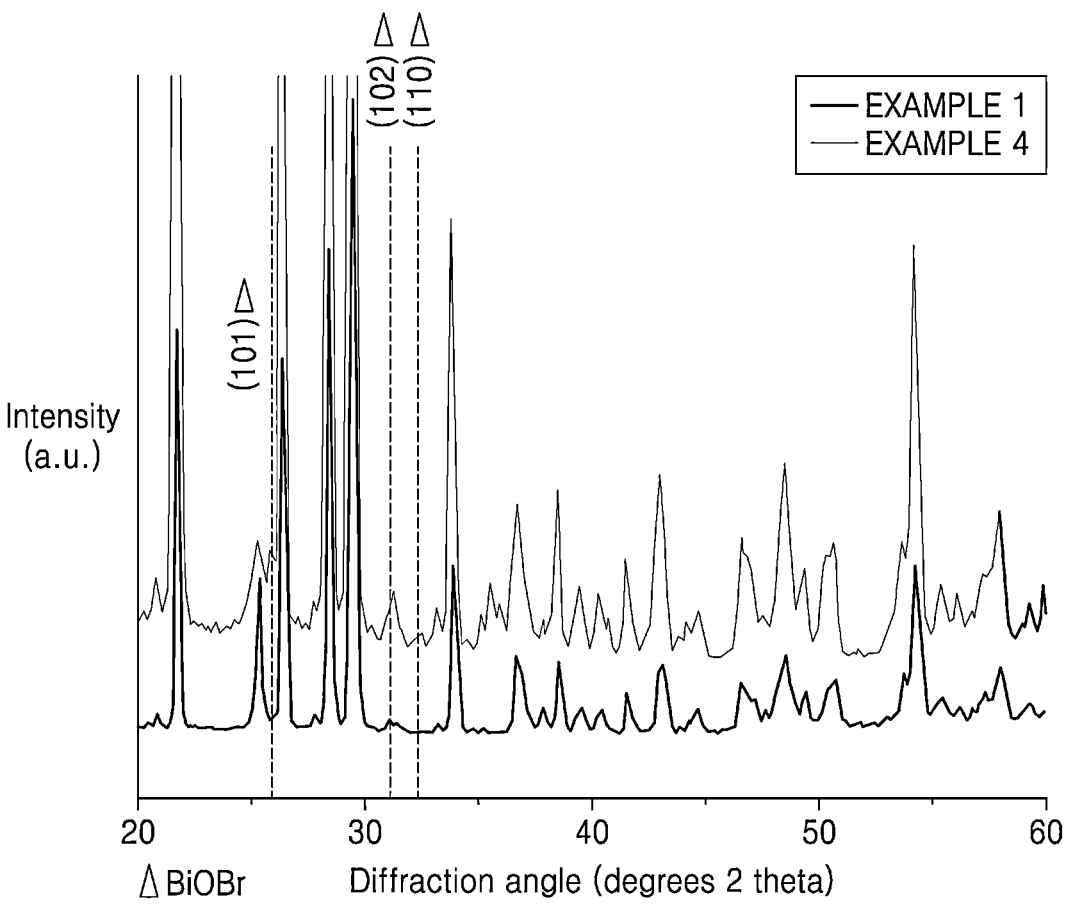
FIG. 9 is a graph of intensity (a.u.) versus diffraction angle (degrees 2 theta) showing XRD analysis results of a ceramic catalyst filter manufactured in Examples 1 and 4.
Figure 10:
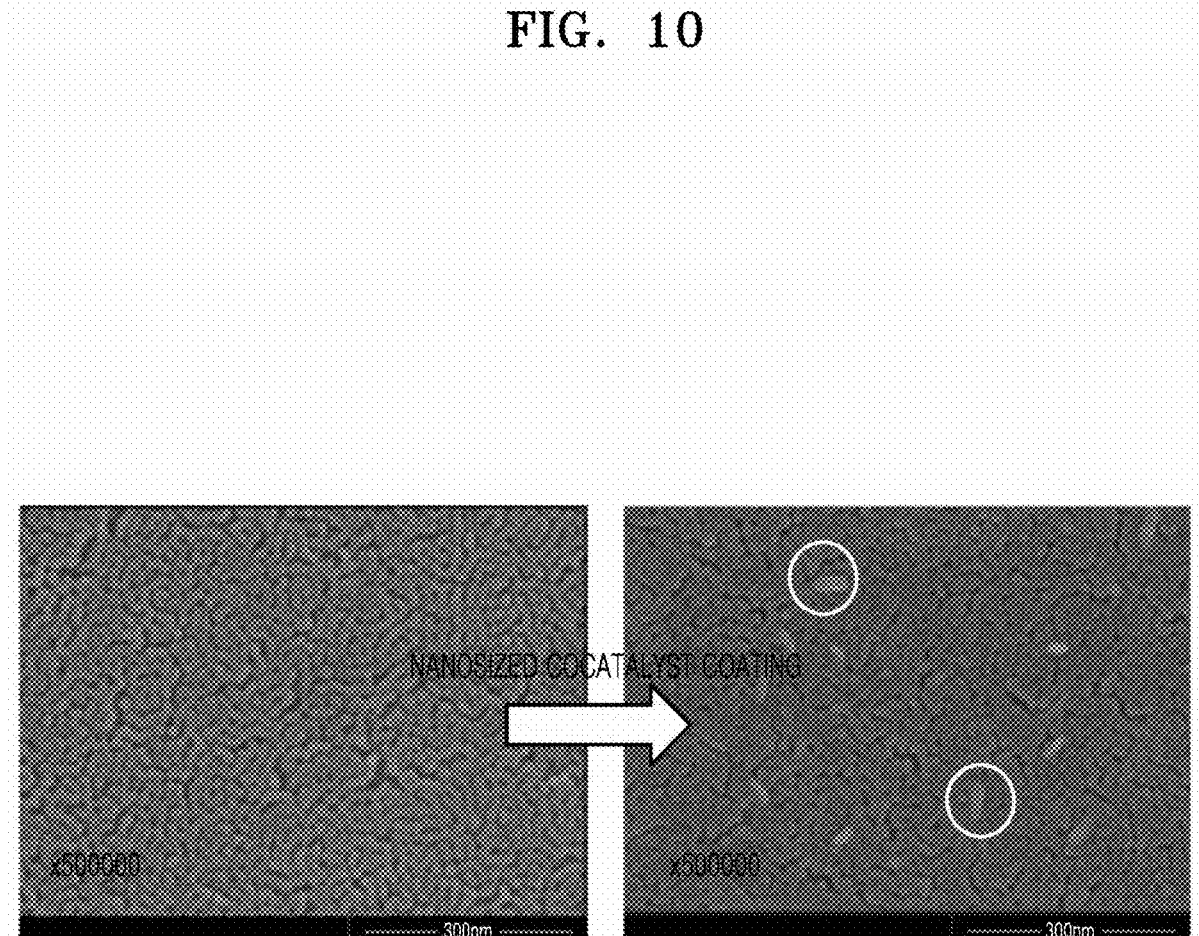
FIG. 10 shows SEM analysis results of the ceramic catalyst filter manufactured in Example 4.

Evaluation Example 5: Photolysis Activity Evaluation of Photocatalytic Thin Film According to Use of Cocatalyst The XRD analysis results and SEM analysis results of the ceramic catalyst filter manufactured in Example 4 were compared with those of Example 1 and shown in FIGS. 9 and 10, respectively. As shown in FIGS. 9 and 10, the ceramic catalyst filter manufactured in Example 4 was identified where the BiOBr cocatalyst (~30 nm) was deposited and coated on the TiO$_2$ photocatalyst thin film having a nanostructure.

Figure 11:
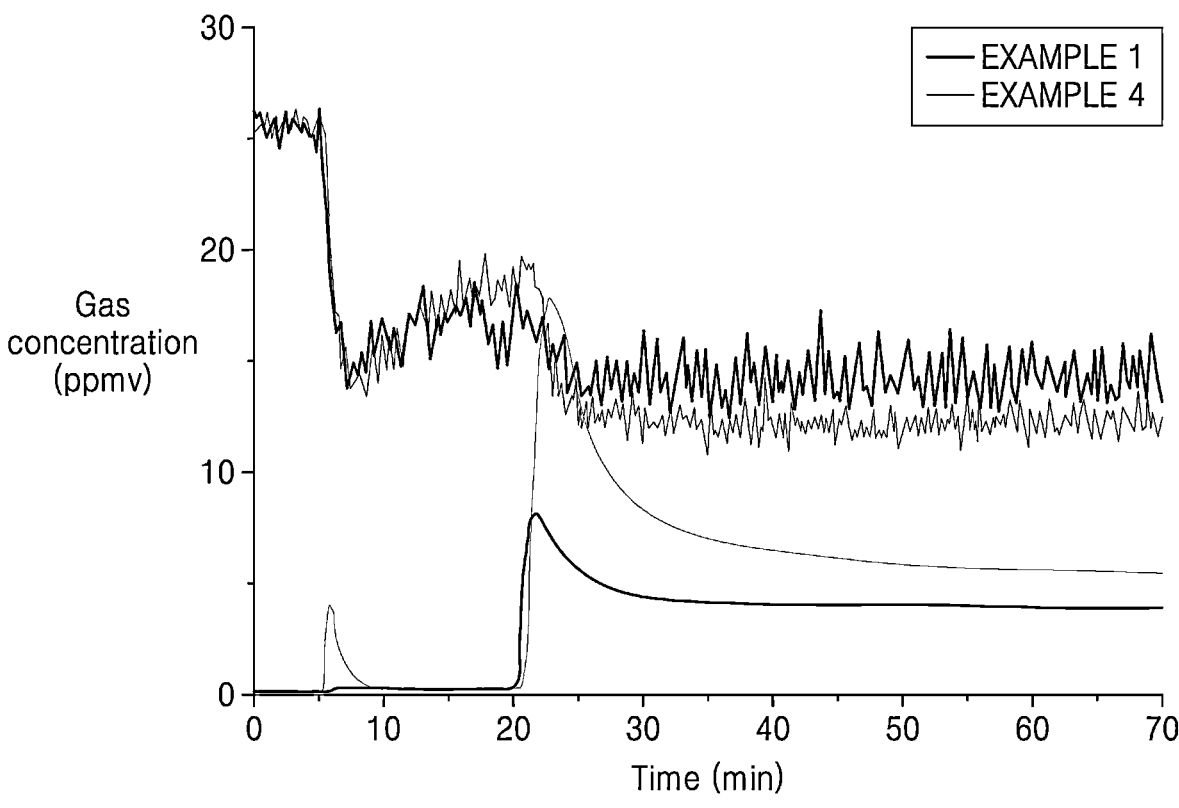
FIG. 11 is a graph of gas concentration (ppmv) versus time (min) showing photolysis experiment results of a photocatalyst thin film according to use of a cocatalyst in the ceramic catalyst filter manufactured in Examples 1 and 4.

The photolysis experiment results of the photocatalyst thin film according to the use of the cocatalyst in the ceramic catalyst filter manufactured in Example 4 are shown in FIG. 11. As shown in FIG. 11, it was found that the photo activity of the ceramic catalyst filter increased from 14.13% to 22.60% according to the use of the cocatalyst to the photocatalyst thin film, indicating an increase in reactive oxygen species (ROS) production.

From the result, it is expected that by using a visible light-sensitive cocatalyst, the photocatalyst filter may be used even with ultraviolet (UV) and visible light irradiation.

Evaluation Example 6: Observation of Difference in Nanostructure Difference of Ceramic Catalyst Filter According to Different Coating Methods To observe the difference in nanostructure of the ceramic catalyst filter according to different coating methods, the results of SEM analysis of the ceramic catalyst filters manufactured in Example 1, Comparative Example 1, and Comparative Example 3 are shown in FIGS. 12 to 14, respectively.

Figure 12:
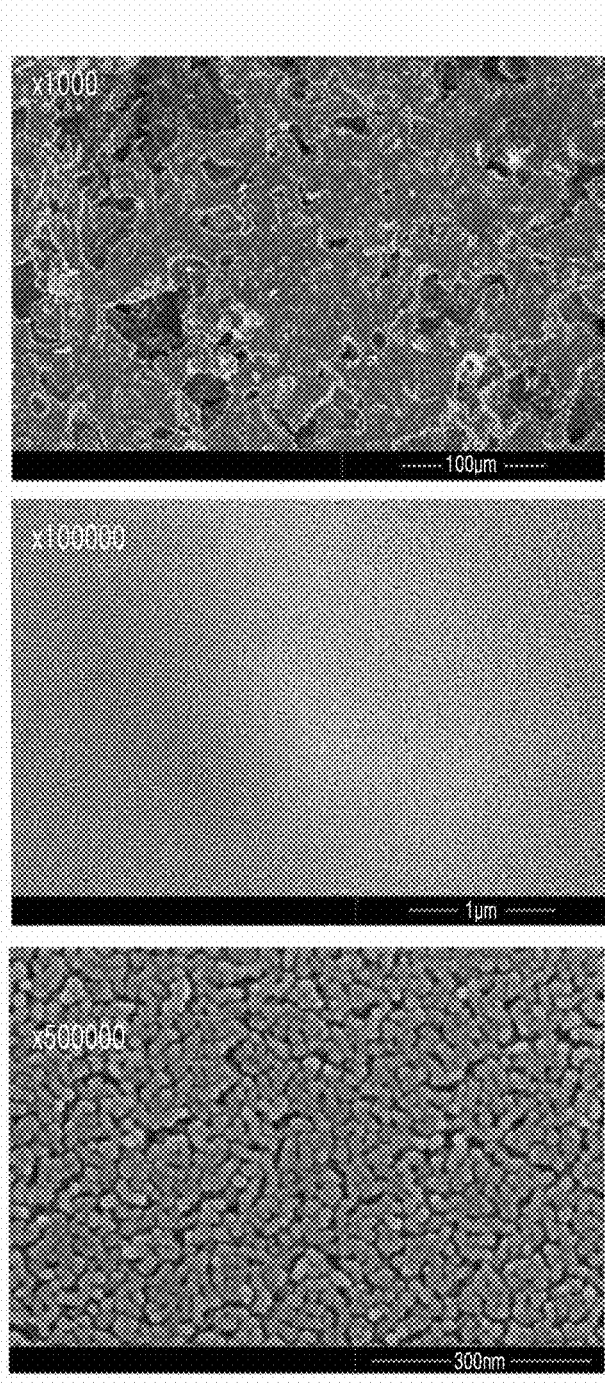
FIG. 12 shows SEM analysis results of the ceramic catalyst filter manufactured in Example 1.
Figure 13:
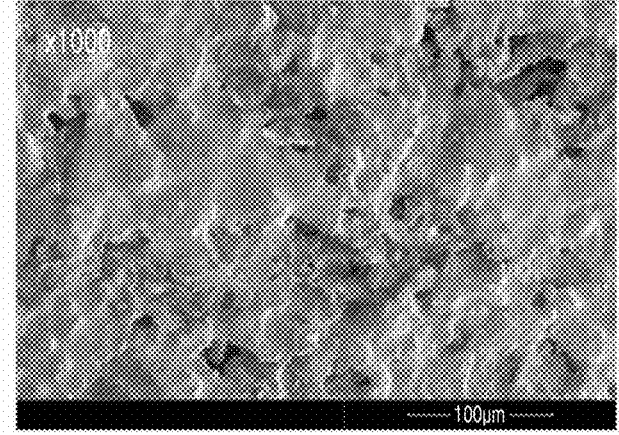
FIG. 13 shows SEM analysis results of a ceramic catalyst filter manufactured in Comparative Example 1.
Figure 13:
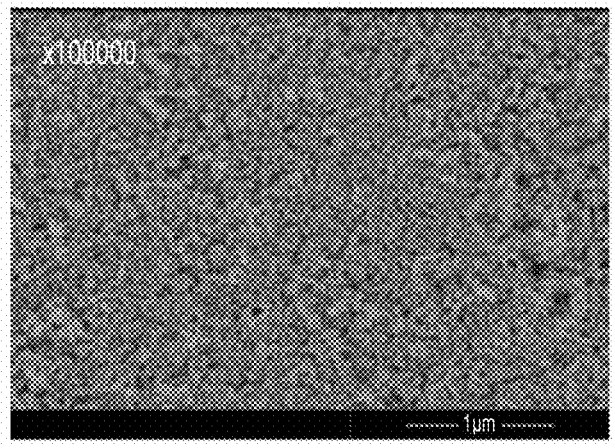
Figure 14:
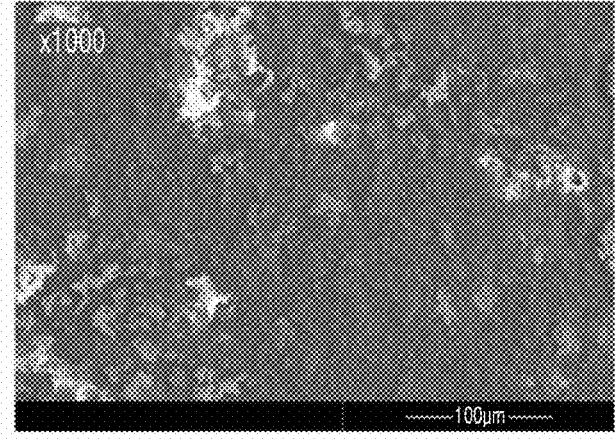
FIG. 14 shows SEM analysis results of a ceramic catalyst filter manufactured in Comparative Example 3.
Figure 14:
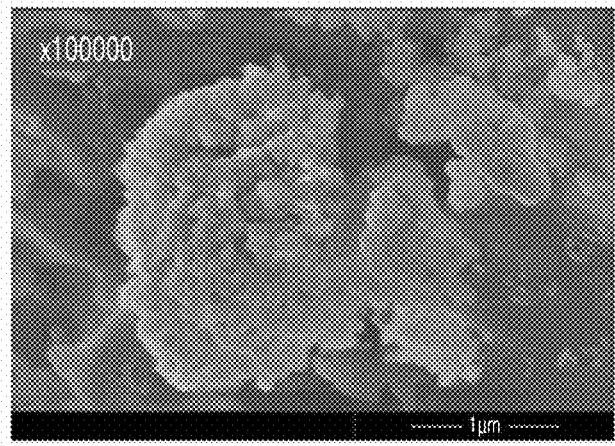

As shown in FIGS. 12 to 14, the ceramic catalyst filter manufactured in Example 1 was found to have a more uniform, nanostructure thin film coating, as compared with the ceramic catalyst filter of Comparative Example 1 coated with the existing TiO$_2$ nanoparticles using the adhesive agent, and even with the ceramic catalyst filter of Comparative Example 3 using the existing sol-gel type ceramic filter coating method.

Figure 15:
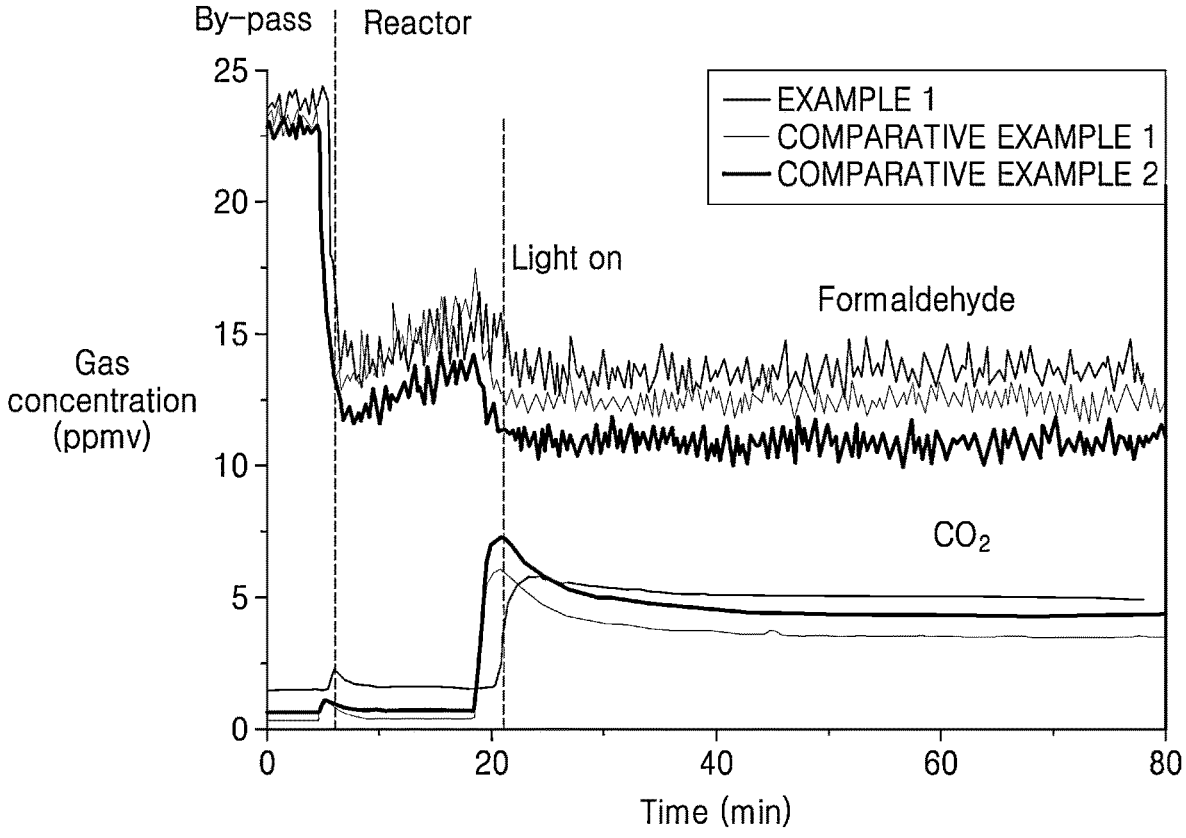
FIG. 15 is a graph of gas concentration (ppmv) versus time (min) showing formaldehyde (FA) photolysis experiment results of the ceramic catalyst filters manufactured in Example 1, Comparative Example 1, and Comparative Example 2.

Evaluation Example 7: Catalyst Loading Amount and Photocatalytic Activity Comparison Formaldehyde (FA) photolysis experiment results of the ceramic catalyst filters manufactured in Example 1, Comparative Example 1, and Comparative Example 2 are shown in FIG. 15, and the catalytic amounts and FA decomposition efficiencies thereof are presented in Table 5. (Experimental conditions: UV 300-400 nm, flow rate 500 mL/min)

TABLE 5

|  | Sample | Catalytic amount (g/L) | FA decomposition efficiency (%) |
| --- | --- | --- | --- |
| Example 1 | F108 TiO$_2$ | 9.02 | 14.13 |
| Comparative Example 1 | TiO$_2$ | 106 | 13.29 |
| Comparative Example 2 | TiO$_2$ | 86 | 15.95 |

As shown in FIG. 15 and Table 5, the nanostructure TiO$_2$ thin film-coated ceramic catalyst filter of Example 1 exhibited a similar formaldehyde photolysis efficiency to that of the ceramic photocatalyst filters of Comparative Examples 1 and 2 coated with TiO$_2$ by using the organic binder.

The ceramic catalyst filter of Example 1 was found to exhibit a higher photolysis efficiency even with a smaller catalytic amount (9 g/L), as compared with those of the ceramic catalyst filters of Comparative Examples 1 and 2 (106 g/L, 86 g/L).

Evaluation Example 8: Fine Dust Removal Efficiency and Differential Pressure Comparison Fine dust removal efficiencies and differential pressures of the ceramic catalyst filters manufactured in Examples 1 to 3 and Comparative Examples 1, 2, and 4 were measured using a particle concentration counter and a differential pressure sensor, respectively. The results are shown in Table 6.

TABLE 6

| | | Sample | | | | | | |
|---|---|---|---|---|---|---|---|---|
| | | Reference Example Bare ceramic filter (CF) | Example 1 F108 TiO$_2$ CCF | Example 2 F68 TiO$_2$ CCF | Example 1 F127 TiO$_2$ CCF | Comparative Example 1 TiO$_2$ & Adhesive agent | Comparative Example 2 TiO$_2$ & Adhesive agent | Comparative Example 4 TiO$_2$ & Adhesive agent |
| Initial differential pressure (Pa) | | 102.5 | 117.7 | 102.4 | 113.1 | 132.6 | 146.2 | 209.3 |
| First-3 times' average removal rate (%) (based on particle number) | PM1.0 | 18.4 | 7.6 | 15.1 | 17.4 | 4.0 | 6.3 | 7.5 |
| | PM2.5-1.0 | 63.4 | 52.9 | 57.9 | 62 | 47.6 | 53.5 | 60.6 |
| | PM10-2.5 | 91.4 | 88.8 | 88.2 | 90.5 | 87.5 | 90 | 88 |
| | PM10 | 21.2 | 11.0 | 19.5 | 22.2 | 8.1 | 10.6 | 11.6 |
| First-3 times' average removal rate (%) (based on particle mass) | PM10 | 60.5 ± 2.3 | 53.1 | 59.3 | 63.4 | 51.5 | 56.2 | 56.7 |

As shown in Table 6, in the case of the catalyst coating method using an existing adhesive agent, the internal differential pressure increased (increases of 30-100 Pa), and due to the high differential pressure, when mounted on an air purifier, the filtering function may decrease, and the lifespan of the air purifier may be reduced.

In the case of the thin film-type catalyst coatings according to Examples 1-3, though showing a similar photolysis efficiency to that of the catalyst coating method using an existing adhesive agent, a small differential pressure change (~10 Pa) was shown and the particle removal rate was not significantly affected. This indicates that the one-pot method is suitable as a ceramic filter coating method.

Figure 16:
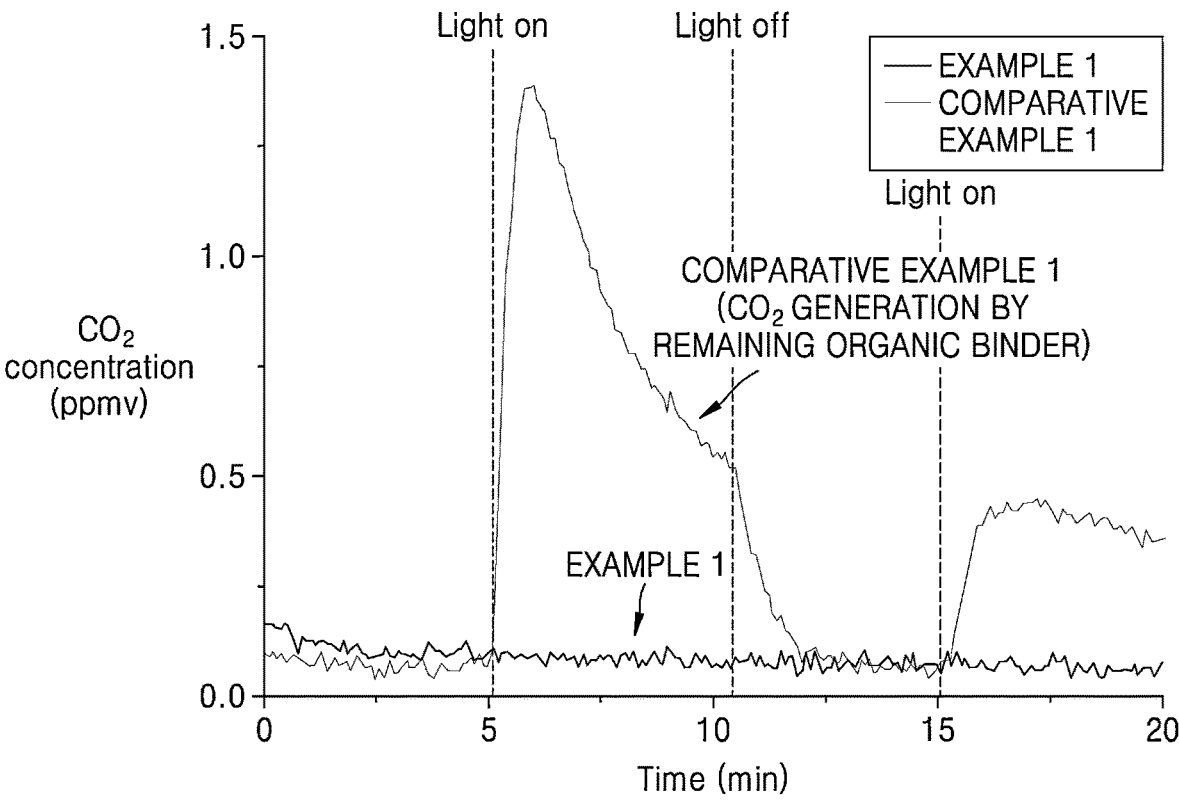
FIG. 16 is a graph of $CO_2$ concentration (ppmv) versus time (min) showing results of a photolysis experiment of a residual organic material on the ceramic catalyst filter when light was irradiated on the ceramic catalyst filters manufactured in Example 1 and Comparative Example 1, in the air without VOC supply.

Evaluation Example 9: Residual Organic Material Photolysis Experiment of Ceramic Catalyst Filter FIG. 16 shows results of a photolysis experiment of the residual organic material on the ceramic catalyst filter when light was irradiated on the ceramic catalyst filters manufactured in Example 1 and Comparative Example 1, in the air without VOC supply. (Experimental conditions: UV 300-400 nm, Flow rate of 500 mL/min, Air)

As shown in FIG. 16, it was found that in the case of the ceramic catalyst filter of Comparative Example 1 coated with TiO$_2$ by using an organic binder, when irradiated with a light source in the air without the supply of VOC, carbon dioxide was produced due to the decomposition of the organic binder remaining after the process. When the adhesive agent is not decomposed 100% during the process, a harmful material may be produced from the ceramic catalyst filter.

However, it was found that the ceramic catalyst filter of Example 1 had a uniform, large-area, nanostructure photocatalyst thin film coated without a binder, and a harmful material was not discharged during photolysis because no organic binder was used during the catalyst coating.

As described above, the ceramic catalyst filter according to an embodiment, may be manufactured by coating a photocatalyst thin film having a uniform nanostructure over a large area using a simple one-pot type method, and can remove fine dust and a VOC at the same time, due to the coating of the uniform photocatalyst thin film, and furthermore, is recyclable through washing, photolysis, and pyrolysis, without the discharge of harmful material.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of manufacturing a ceramic catalyst filter comprising a single body ceramic filter comprising a first surface for blocking a first material and a second surface for removing a second material passing through the first surface, and a photocatalyst thin film comprising nanometer-scale grains coated on a surface of the ceramic filter, the method comprising:

preparing a coating solution comprising a self-assembly polymer and a photocatalyst precursor;

coating the ceramic filter with the coating solution by dipping the ceramic filter in the coating solution; and drying and then heat-treating the ceramic filter coated with the coating solution, wherein the drying is performed in a vacuum oven at a temperature of 70 to 100° C.

2. The method of claim 1, wherein the self-assembly polymer self-assembles to form a nano arrangement structure after being coated on the ceramic filter.

3. The method of claim 1, wherein the self-assembly polymer comprises:

i) a copolymer comprising a polyethylene oxide block, a polypropylene oxide block, a polystyrene block, a polybutylene block, or a combination thereof;

ii) a polymer comprising an acrylate polymer, a cellulose polymer, polystyrene, or a combination thereof; or iii) a combination thereof.

4. The method of claim 1, wherein the self-assembly polymer comprises a polyethylene oxide-polypropylene oxide block, a polyethylene oxide-polypropylene oxide-polyethylene oxide block, a polypropylene oxide-polyethylene oxide-polypropylene oxide block, a polystyrene-polyethylene oxide-polystyrene block, a polystyrene-polybutylene-polystyrene block, or a combination thereof.

5. The method of claim 1, wherein the dipping of the ceramic filter is performed using a one-pot method.

6. The method of claim 1, wherein the heat-treating is performed in a furnace at a temperature of 400 to 800° C.

7. A ceramic catalyst filter manufactured according to the method of claim 1, wherein the nanometer-scale grains have assembled nano-alignment structure.

8. The ceramic catalyst filter of claim 7, wherein the nanometer-scale grains form a worm-like alignment structure.

9. The ceramic catalyst filter of claim 7, wherein the nanometer-scale grains have an average grain size of about 1 nanometer to about 1,000 nanometers.

10. The ceramic catalyst filter of claim 7, wherein the photocatalyst thin film has a specific surface area of about 1 to about 300 square meters per gram, pores having a diameter of about 1 to about 100 nanometers, and a pore volume in a range of about $1 \times 10^{-3}$ to about 1 cubic centimeters per gram.

11. The ceramic catalyst filter of claim 7, wherein the photocatalyst thin film comprises a metal oxide photocatalyst.

12. The ceramic catalyst filter of claim 11, wherein the metal oxide photocatalyst comprises $TiO_2$, $WO_3$, $BiVO_4$, $ZnO$, $SiO_2$, $BaTiO_3$, $Fe_2O_3$, $Fe_3O_4$, or a combination thereof.

13. The ceramic catalyst filter of claim 11, wherein the photocatalyst thin film further comprises a cocatalyst for improving photolysis characteristics or pyrolysis characteristics of the metal oxide photocatalyst, wherein the cocatalyst comprises:

i) a metal compound capable of performing an oxygen generation reaction or an oxygen reduction reaction;

ii) a metal compound capable of performing an oxidation reaction at about 200° C. or less; or iii) a combination thereof.

14. The ceramic catalyst filter of claim 13, wherein the cocatalyst comprises $CoO_x$ wherein $0 < x < 2$, $MnO_2$, $ZnO_2$, $BiOBr$, $BiOI$, Au oxide, Ag oxide, Ir oxide, Rh oxide, Pt oxide, Ce oxide, Cu, Co, Ni, Mn, Fe, Al, Si, a noble metal, or a combination thereof.

15. The ceramic catalyst filter of claim 7, wherein the single body ceramic filter is porous.

16. The ceramic catalyst filter of claim 7, wherein the first surface and the second surface of the single body ceramic filter comprise surfaces that are parallel to each other.

17. The ceramic catalyst filter of claim 7, wherein the single body ceramic filter comprises:

a plurality of first grooves each having an inlet at a first side of the ceramic filter through which the first and second materials enter; and a plurality of second grooves each having an inlet at a second side of the ceramic filter through which the second material is discharged.

18. The ceramic catalyst filter of claim 17, wherein a bottom of each of the second grooves is between the inlets of adjacent first grooves, and a bottom of each of the first grooves is between the inlets of adjacent second grooves.

19. The ceramic catalyst filter of claim 17, wherein bottoms of the first grooves have a structure for blocking the second material.

20. The ceramic catalyst filter of claim 17, further comprising a wall between the first grooves and the second grooves wherein the wall between the first grooves and the second grooves has air permeability, and the wall is configured to allow the second material to permeate therethrough.

21. The ceramic catalyst filter of claim 7, wherein the first material comprises fine dust, and the second material comprises a volatile organic compound.

22. A filtering system comprising:

the ceramic catalyst filter according to claim 7; and an energy supply source arranged in the ceramic catalyst filter to supply energy for catalyst activation.

23. The filtering system of claim 22, wherein the energy supply source is configured to supply photo energy, electric energy, ion energy, thermal energy, or a combination thereof.

24. A method of manufacturing a ceramic catalyst filter comprising a single body ceramic filter comprising a first surface for blocking a first material and a second surface for removing a second material passing through the first surface, and a photocatalyst thin film comprising nanometer-scale grains coated on a surface of the ceramic filter, the method comprising:

preparing a coating solution comprising a self-assembly polymer and a photocatalyst precursor;

coating the ceramic filter with the coating solution by dipping the ceramic filter in the coating solution; and drying and then heat-treating the ceramic filter coated with the coating solution, wherein the self-assembly polymer is a block copolymer comprising 50 to 90 weight percent of a polyethylene oxide block and 10 to 50 weight percent, of a polypropylene oxide block, each based on a total weight of the block copolymer.

25. A ceramic catalyst filter comprising:

a single body ceramic filter comprising a first surface for blocking a first material and a second surface for removing a second material passing through the first surface; and a photocatalyst thin film comprising nanometer-scale grains coated on a surface of the ceramic filter, wherein the photocatalyst thin film comprises a self-assembly polymer comprising a block copolymer comprising 50 to 90 weight percent of a polyethylene oxide block and 10 to 50 weight percent, of a polypropylene oxide block, each based on a total weight of the block copolymer.

* * * * *